(12) United States Patent
Yoo et al.

(10) Patent No.: US 12,283,884 B2
(45) Date of Patent: Apr. 22, 2025

(54) DC-DC CONVERTER AND POWER DEVICE INCLUDING THE SAME

(71) Applicant: SAMSUNG ELECTRONICS CO., LTD., Suwon-si (KR)

(72) Inventors: Sungmin Yoo, Seoul (KR); Minsu Kim, Seoul (KR); Hyungmin Lee, Seoul (KR); Taehwang Kong, Suwon-si (KR); Junhyeok Yang, Seoul (KR); Woojoong Jung, Seoul (KR)

(73) Assignees: SAMSUNG ELECTRONICS CO., LTD., Suwon-si (KR); Korea University Research and Business Foundation, Seoul (KR)

( * ) Notice: Subject to any disclaimer, the term of this patent is extended or adjusted under 35 U.S.C. 154(b) by 288 days.

(21) Appl. No.: 17/993,603

(22) Filed: Nov. 23, 2022

(65) Prior Publication Data

US 2023/0170795 A1    Jun. 1, 2023

(30) Foreign Application Priority Data

Nov. 26, 2021 (KR) .................. 10-2021-0165646
Feb. 17, 2022 (KR) .................. 10-2022-0020801

(51) Int. Cl.
*H02M 3/07* (2006.01)
*H02M 1/00* (2007.01)

(52) U.S. Cl.
CPC .......... *H02M 3/07* (2013.01); *H02M 1/0054* (2021.05); *H02M 1/0095* (2021.05); *H02M 3/072* (2021.05)

(58) Field of Classification Search
CPC ......... H02M 3/07–078; H02M 1/0095; H02M 1/0012; H02M 1/0054; H02M 1/00; H02M 1/08; H02M 1/0048; Y02B 70/10
See application file for complete search history.

(56) References Cited

U.S. PATENT DOCUMENTS 10,069,408 B2    9/2018  Abdulslam et al.
10,075,080 B1    9/2018  Scoones et al.
(Continued)

FOREIGN PATENT DOCUMENTS

KR    10-2020-0039803 A    4/2020
KR    10-2021-0070030 A    6/2021

OTHER PUBLICATIONS

Xue, et al., "A 2MHz 12-to-100V 90%-Efficiency Self-Balancing ZVS Three-Level DC-DC Regulator with Constant-Frequency AOT V2 Control and 5ns ZVS Turn-On Delay", 2016, IEEE International Solid-State Circuits Conference, 3 pages total.
(Continued)

*Primary Examiner* — Fred E Finch, III
*Assistant Examiner* — Jennifer C Caulk
(74) *Attorney, Agent, or Firm* — Sughrue Mion, PLLC

(57) ABSTRACT

The present disclosure refers to direct current-to-direct current (DC-DC) converters and power supplies including the same. In an embodiment, a DC-DC converter includes a first switching circuit, a second switching circuit, a fourth capacitor coupled to a second node, and an inductor-capacitor (LC) filter coupled to a third node. The first switching circuit includes a first transistor coupled between a first capacitor and an input node, a second transistor coupled between the first capacitor and a second capacitor, a third transistor coupled between a first node and a third capacitor, and a fourth transistor coupled between the third capacitor and a ground node. The second switching circuit includes a fifth transistor coupled between the second capacitor and the third capacitor, a sixth transistor and a seventh transistor coupled between the first capacitor and the third capacitor, and an eighth transistor coupled between the first capacitor and the ground node.

10 Claims, 22 Drawing Sheets

(56) References Cited

U.S. PATENT DOCUMENTS

| | | |
|---|---|---|
| 10,547,241 B1* | 1/2020 | Li .................... H02M 3/1588 |
| 10,749,434 B2 | 8/2020 | Giuliano et al. |
| 11,005,366 B2 | 5/2021 | Huang et al. |
| 2018/0358896 A1 | 12/2018 | Puggelli et al. |
| 2020/0212795 A1 | 7/2020 | Das et al. |
| 2020/0212801 A1* | 7/2020 | Cavallini .............. H02M 3/158 |
| 2020/0321859 A1 | 10/2020 | Kotikalapoodi |
| 2020/0326384 A1 | 10/2020 | Ashourloo et al. |
| 2021/0119540 A1* | 4/2021 | Kawano .............. H02M 1/0095 |
| 2021/0288581 A1 | 9/2021 | Zhu et al. |
| 2021/0408891 A1* | 12/2021 | Yao ........................ H02M 1/08 |
| 2022/0294349 A1* | 9/2022 | Kawano ................ H02M 3/158 |

OTHER PUBLICATIONS

Liu, et al., "A High-Frequency Three-Level Buck Converter With Real-Time Calibration and Wide Output Range for Fast-DVS", 2018, IEEE Journal of Solid-State Circuits, vol. 53, No. 2, 14 pages total.

\* cited by examiner

DC-DC CONVERTER AND POWER DEVICE INCLUDING THE SAME

CROSS-REFERENCE TO RELATED APPLICATIONS

This application is based on and claims priority under 35 USC § 119 to Korean Patent Application No. 10-2021-0165646, filed on Nov. 26, 2021, and to Korean Patent Application No. 10-2022-0020801 filed, on Feb. 17, 2022, in the Korean Intellectual Property Office, the disclosures of which are incorporated herein in their entireties by reference.

BACKGROUND

1. Field

The present disclosure relates to a direct current-to-direct current (DC-DC) converter and to a power supply including the same.

2. Description of Related Art

Electronic devices may operate by a power voltage supplied from a battery or an external power source. In related art devices, a DC voltage output from a battery, or the like, may be converted into a DC voltage suitable for the operation of other devices inside an electronic device by a DC-DC converter. The DC-DC converter may be implemented with various circuits. Research into DC-DC converters is actively carried out, in which high power conversion efficiency may be obtained regardless of the ratio of the input voltage to the output voltage, and the ripple component of the output voltage may be reduced, and at the same time, a simple structure may be provided.

SUMMARY

Example embodiments provide a direct current-to-direct current (DC-DC) converter and a power supply device including the same, in which an output voltage ripple may be reduced and conduction loss of transistors provided as switch elements may be reduced to improve power conversion efficiency, and which may be implemented with a simple structure without an additional feedback circuit, when compared with related devices.

According to example embodiments, a DC-DC converter includes a first switching circuit, a second switching circuit, a fourth capacitor, and an inductor-capacitor (LC) filter. The first switching circuit includes a first transistor coupled between a first capacitor and an input node, a second transistor coupled between the first capacitor and a second capacitor, a third transistor coupled between a first node and a third capacitor, and a fourth transistor coupled between the third capacitor and a ground node. The first node is between the second capacitor and the second transistor. The second switching circuit includes a fifth transistor coupled between the second capacitor and the third capacitor, a sixth transistor and a seventh transistor coupled between the first capacitor and the third capacitor, and an eighth transistor coupled between the first capacitor and the ground node. The fourth capacitor is coupled to a second node between the sixth transistor and the seventh transistor. The LC filter is coupled to a third node. The third node couples the first capacitor, the second transistor, and the eighth transistor.

According to example embodiments, a DC-DC converter includes a first transistor, a second transistor, a third transistor, a fourth transistor, a fifth transistor, a sixth transistor, a seventh transistor, an eighth transistor, and an LC filter. The first transistor is configured to provide a first current path between an input node and an output node. The first transistor is further configured to charge, using the first current path, a first capacitor during a first portion of a time period. The second transistor is configured to provide a second current path between a ground node and the output node. The second transistor is further configured to discharge, using the second current path, a second capacitor during the first portion of the time period. The third transistor and a fourth transistor are configured to provide a third current path between the ground node and the output node. The third transistor and a fourth transistor are further configured to discharge, using the third current path, a third capacitor during the first portion of the time period The fifth transistor, the sixth transistor, the seventh transistor, and the eighth transistors are configured to couple together, during a second portion of the time period, the first capacitor, the second capacitor, and the third capacitor. The second portion of the time period is different from the first portion of the time period. The LC filter has an inductor coupled to the output node and an output capacitor coupled to the inductor. The second transistor is further configured to provide the second current path and the third current path.

According to example embodiments, a power supply device includes a DC-DC converter, control logic, and a driver. The DC-DC converter includes a switched capacitor circuit having a plurality of transistors and a plurality of capacitors, and an LC filter having an inductor and an output capacitor. The DC-DC converter is configured to generate an output voltage by stepping down a level of an input voltage. The control logic is configured to output a pulse width modulation (PWM) signal by comparing the output voltage with a predetermined reference voltage. The driver is configured to output control signals controlling the plurality of transistors, based on the PWM signal. The control logic and the driver operate by receiving a power supply voltage lower than the input voltage and greater than the output voltage from the DC-DC converter.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION

The embodiments described herein are example embodiments, and thus, the disclosure is not limited thereto and may be realized in various other forms.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described with reference to the accompanying drawings.

Figure 1:
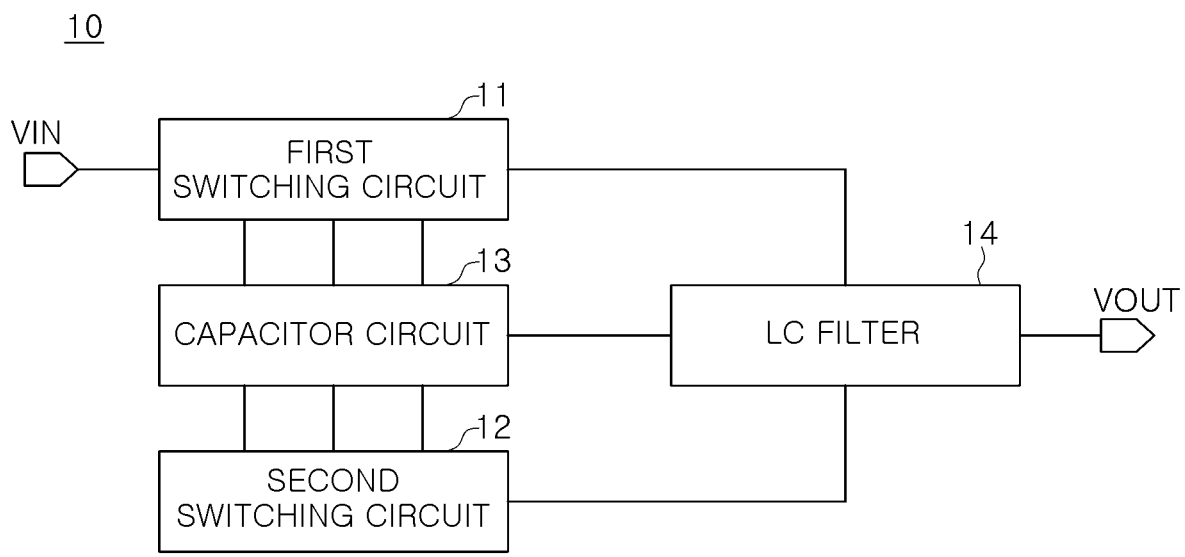
FIG. 1 is a block diagram schematically illustrating a direct current-to-direct current (DC-DC) converter according to various example embodiments.

FIG. 1 is a block diagram schematically illustrating a direct current-to-direct current (DC-DC) converter according to an example embodiment.

Referring to FIG. 1, a DC-DC converter 10 according to an example embodiment may include a first switching circuit 11, a second switching circuit 12, a capacitor circuit 13, an inductor-capacitor (LC) filter 14 (e.g., low-pass filter), and the like. The DC-DC converter 10 may output an output voltage VOUT by stepping down an input voltage VIN, and the magnitude of the output voltage VOUT may be determined by the input voltage VIN and the voltage conversion ratio of the DC-DC converter 10.

Each of the first switching circuit 11 and the second switching circuit 12 includes a plurality of switches, and each of the plurality of switches may be implemented as a transistor. For example, a portion of the plurality of transistors included in the first switching circuit 11 and the second switching circuit 12 may be n-type metal oxide semiconductor (NMOS) transistors, and remaining transistors of the plurality of transistors may be p-type metal oxide semiconductor (PMOS) transistors.

The capacitor circuit 13 may include a plurality of capacitors. For example, the plurality of capacitors may be connected (e.g., electrically coupled) to the plurality of transistors included in the first switching circuit 11 and the second switching circuit 12 to provide a switched capacitor circuit. At least one capacitor of the plurality of capacitors may be included in one integrated circuit chip together with the first switching circuit 11 and the second switching circuit 12, and the remaining portion of the plurality of capacitors may be disposed outside the integrated circuit chip and/or connected (e.g., coupled) to the integrated circuit chip.

The LC filter 14 (e.g., low-pass filter) may include an inductor and an output capacitor, and may be connected to an output terminal of the switched capacitor circuit provided by the first switching circuit 11, the second switching circuit 12, and the capacitor circuit 13. One end of the inductor may be directly connected to the output terminal of the switched capacitor circuit, and the other end of the inductor may be connected to the ground node through the output capacitor. Accordingly, the LC filter 14 may be connected to the switched capacitor circuit while significantly reducing the addition of the number of pins of the integrated circuit chip.

In an example embodiment, the switched capacitor circuit provided by the first switching circuit 11, the second switching circuit 12 and the capacitor circuit 13 may supply current to the inductor of the LC filter 14 through a plurality of current paths. For example, the DC-DC converter 10 may operate according to a predetermined period, and one period of the DC-DC converter 10 may include a first time period (e.g., a first portion of a time period, a first time period) and a second time period (e.g., a second portion of the time period, a second time period).

During the first time period, the switched capacitor circuit may supply current to the inductor to store energy in the inductor. Alternatively or additionally, the energy stored in the inductor may be discharged during the second time period. By supplying current to the inductor through a plurality of current paths during the first time period, the number of transistors included in each of the current paths may be significantly reduced, which, as a result, may reduce conduction loss. In addition, since the current level that one transistor needs to handle may be reduced, the DC-DC converter 10 may be implemented with transistors having a small size.

Figure 2:
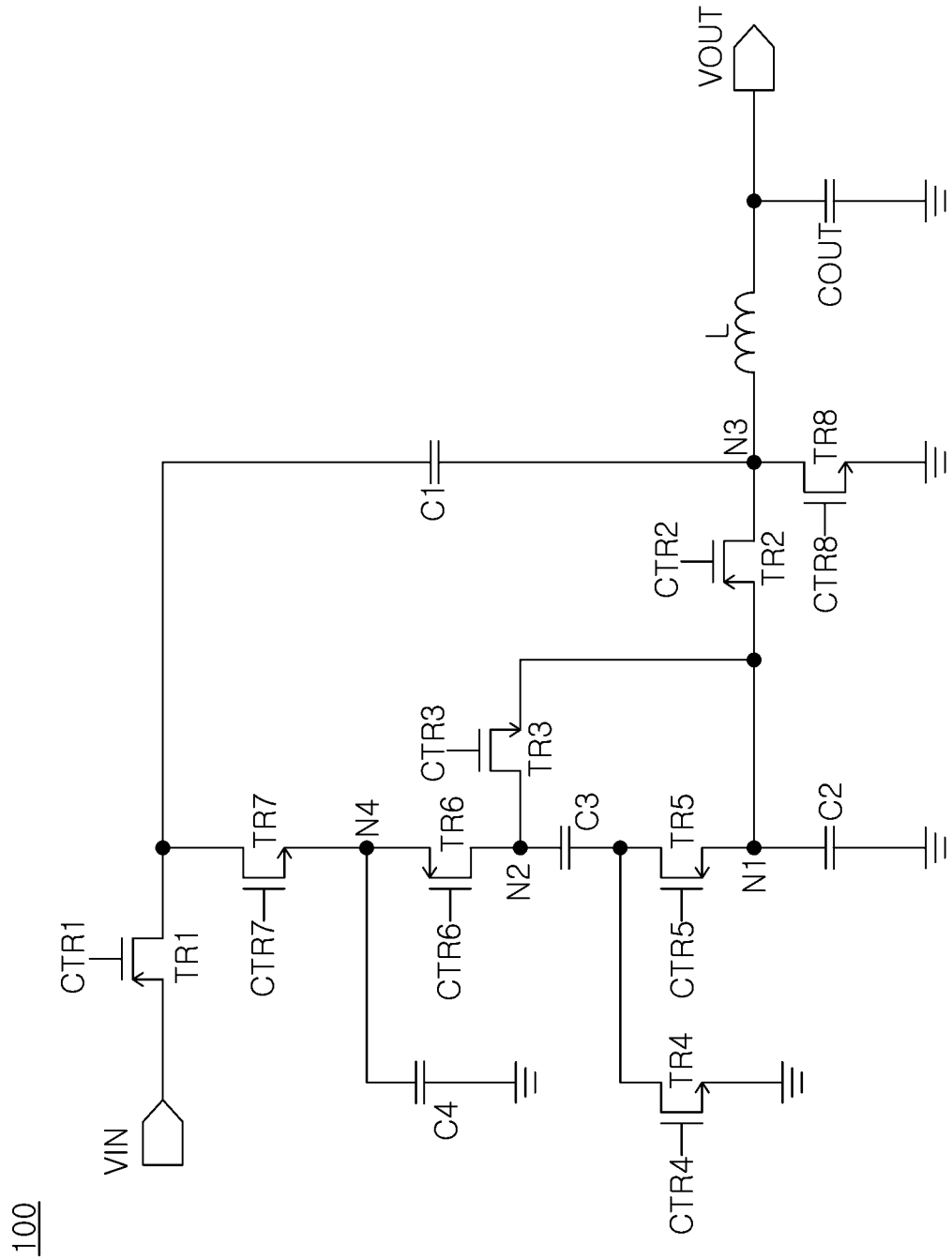
FIG. 2 is a circuit diagram schematically illustrating a DC-DC converter according to various example embodiments.

FIG. 2 is a circuit diagram schematically illustrating a DC-DC converter according to an example embodiment.

Referring to FIG. 2, a DC-DC converter 100 according to an example embodiment may include a switched capacitor circuit and an LC filter provided by a plurality of transistors (e.g., TR1-TR8) and a plurality of capacitors (e.g., C1-C4). The LC filter may include an inductor L and an output capacitor COUT. Some (e.g., a portion) of the plurality of transistors (e.g., TR1-TR8) may consist of NMOS transistors, and the remaining portions may consist of PMOS transistors.

Among the plurality of transistors (e.g., TR1-TR8), the first to fourth transistors (e.g., TR1-TR4) may provide a first switching circuit, and the fifth to eighth transistors (e.g., TR5-TR8) may provide a second switching circuit. The DC-DC converter 100 may operate according to a predetermined cycle, and one period of the DC-DC converter 100 may include a first time period and a second time period. For example, during the first time period, the first to fourth transistors TR1-TR4 may be turned on and the fifth to eighth transistors TR5-TR8 may be turned off. Alternatively or additionally, during the second time period, the first to fourth transistors TR1-TR4 may be turned off and the fifth to eighth transistors TR5-TR8 may be turned on. The switching on and/or switching off of the plurality of transistors TR1-TR8 may be determined by control signals (e.g., CTR1-CTR8).

The plurality of transistors TR1-TR8 may be connected (e.g., electrically coupled) to the plurality of capacitors (e.g., C1-C4). For example, the first transistor TR1 may be connected between an input node, to which the input voltage VIN is input, and the first capacitor C1. In another example, the second transistor TR2 may be connected between the first capacitor C1 and the second capacitor C2. Alternatively or additionally, the third transistor TR3 may be connected between a first node N1, to which the second capacitor C2 and the second transistor TR2 are connected, and the third capacitor C3. Referring to FIG. 2, the third transistor TR3 may be connected between the first node N1 and a second node N2 to which the third capacitor C3 is connected. The fourth transistor TR4 may be connected between the third capacitor C3 and the ground node.

In some embodiments, the fifth transistor TR5 may be connected between the second capacitor C2 and the third capacitor C3. The sixth transistor TR6 and the seventh transistor TR7 may be connected between the first capacitor C1 and the third capacitor C3. For example, the fourth capacitor C4 may be connected to a fourth node N4 between the sixth transistor TR6 and the seventh transistor TR7. The eighth transistor TR8 may be connected between the first capacitor C1 and the ground node. Referring to FIG. 2, the eighth transistor TR8 may be connected between a ground node and a third node N3. The third node N3 may connect the first capacitor C1, the second transistor TR2, and the inductor L to each other.

In some embodiments, the first to third capacitors C1-C3 may be external capacitors disposed outside the integrated circuit chip including the plurality of transistors TR1-TR8. On the other hand, the fourth capacitor C4 may be implemented in the integrated circuit together with the plurality of transistors TR1-TR8. A capacity (e.g., capacitance) of each of the first to third capacitors C1-C3 may be greater than a capacity of the fourth capacitor C4. For example, the capacity of the fourth capacitor C4 may be several tens to several hundreds of pico-Farads (pF). Alternatively or additionally, the capacity of the output capacitor COUT may also be greater than the capacity of the fourth capacitor C4.

While the DC-DC converter 100 is operating, the voltage of the first node N1 may be one third (e.g., ⅓) of the input voltage, and the voltage of the second node N2 may be two-thirds (e.g., ⅔) of the input voltage. Accordingly, the voltage of the second capacitor C2 and the voltage of the third capacitor C3 may be maintained at a level equivalent to one-third of the input voltage, respectively. The voltage of the first capacitor C1 may be maintained at a level equivalent to two-thirds of the input voltage.

As described above, one period of the DC-DC converter 100 may be divided into a first time period and a second time period, the first to fourth transistors TR1-TR4 may be turned on during the first time period, and the fifth to eighth transistors TR5-TR8 may be turned on during the second time period. During the first time period, a current may be supplied to the inductor L through a plurality of current paths to charge energy into the inductor L, and, during the second time period, the energy of the inductor L may be discharged. Alternatively or additionally, in the DC-DC converter 100, according to the example embodiment illustrated in FIG. 2, the voltages of the first to third capacitors C1-C3 may be constantly maintained without a separate feedback circuit, which is described below in more detail with reference to FIGS. 3 to 6.

FIGS. 3 to 6 are diagrams illustrating the operation of the DC-DC converter according to an example embodiment.

Figure 3:
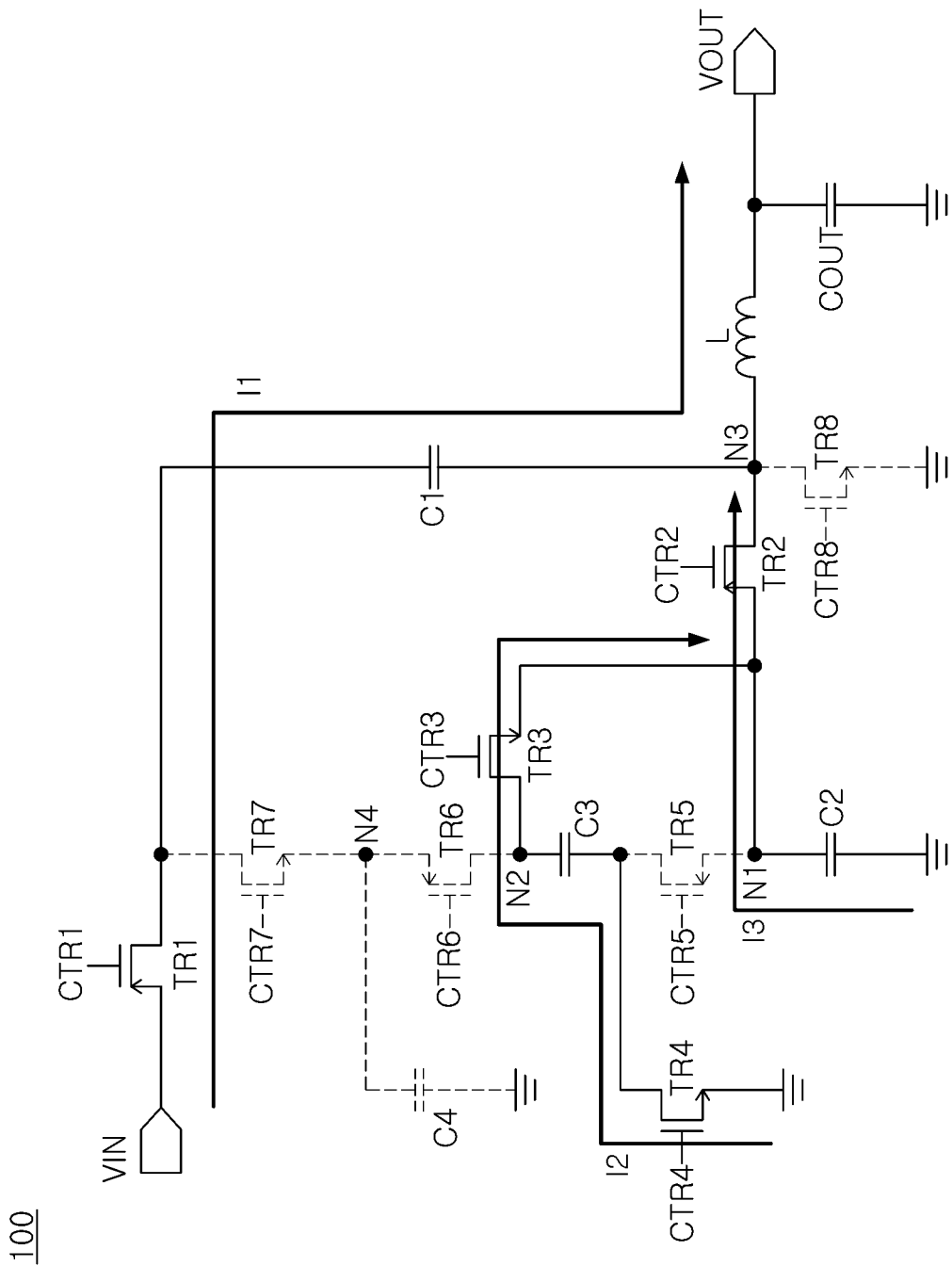
FIGS. 3 to 6 are diagrams illustrating the operation of a DC-DC converter according to various example embodiments.
Figure 4:
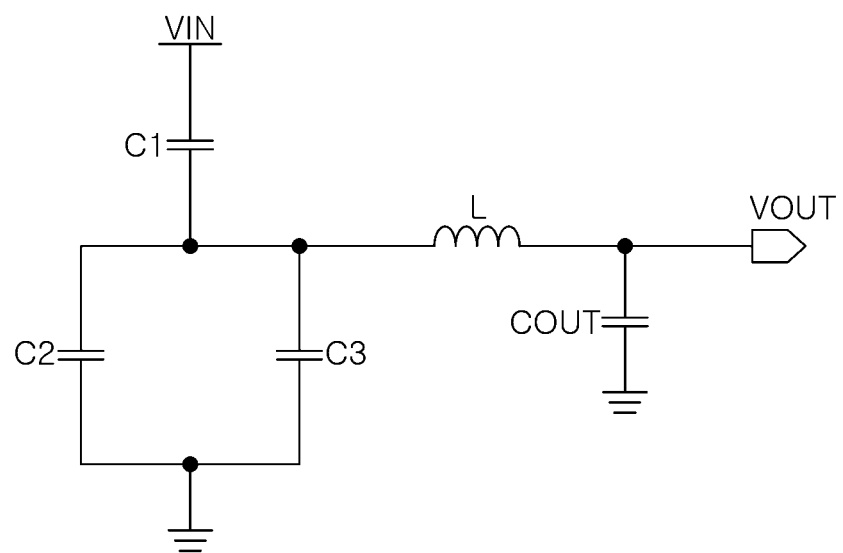
Figure 5:
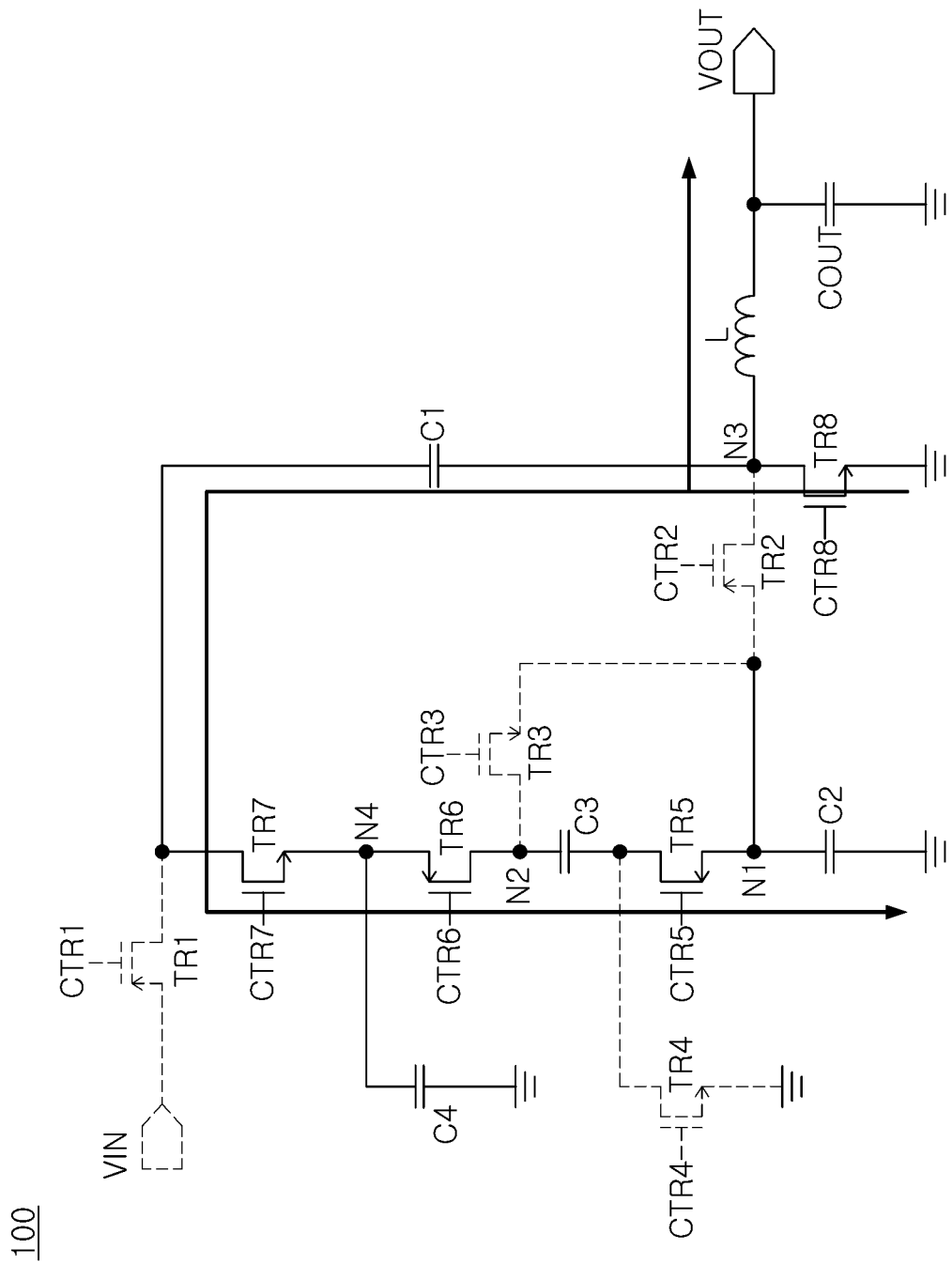
Figure 6:
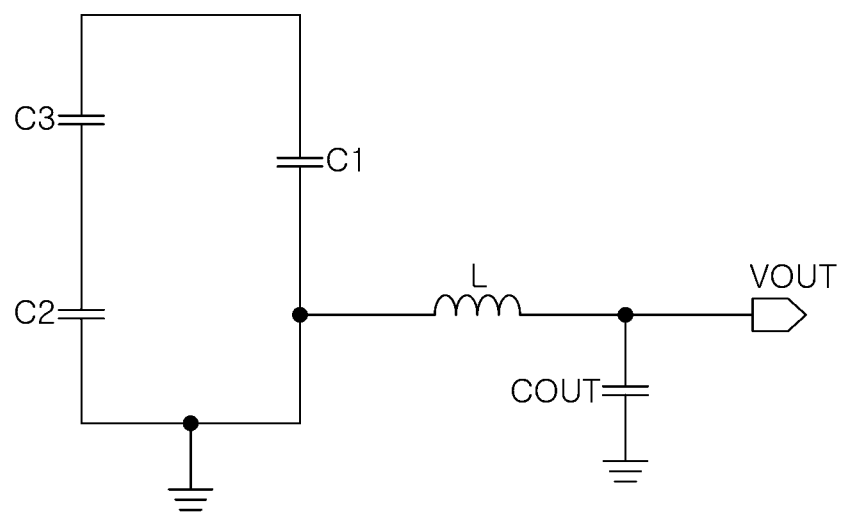

FIG. 3 is be a diagram illustrating the operation of the DC-DC converter 100 during a first time period in the one period, and FIG. 4 is a diagram illustrating an equivalent circuit of the DC-DC converter 100 during the first time period in the one period. FIG. 5 is a diagram illustrating the operation of the DC-DC converter 100 during a second time period in the one period, and FIG. 6 is a diagram illustrating an equivalent circuit of the DC-DC converter 100 during the second time period in the one period.

First, referring to FIG. 3, as described above, during the first time period, the first to fourth transistors (e.g., TR1-TR4) may be turned on and the fifth to eighth transistors (e.g., TR5-TR8) may be turned off in the DC-DC converter 100. Accordingly, as illustrated in FIG. 3, the first to third currents (e.g., I1-I3) may be supplied to the inductor L through a plurality of current paths.

For example, the first current I1 may be supplied to the inductor L by a first current path including the first transistor TR1 and the first capacitor C1. The second current I2 may flow through a second current path including the second capacitor C2 and the second transistor TR2, and the third current I3 may flow through a third current path including the third capacitor C3 and the second to fourth transistors TR2-TR4. During the first time, the first capacitor C1 may be charged, and the second capacitor C2 and the third capacitor C3 may be discharged.

As described with reference to FIG. 3, the first current path and the second current path may include one transistor, and the third current path may include three transistors. In the DC-DC converter 100 according to an example embodiment, the number of transistors included in each of the current paths may be optimized, and thus, conduction loss proportional to the square of the current flowing through the transistor may be reduced. The current flowing through each current path may be lowered by distributing the current through a plurality of current paths, and at the same time, the conduction loss of the DC-DC converter 100 may be significantly reduced by optimizing the number of transistors included in each current path. As an example, as illustrated in FIG. 3, currents I1-I3 may be supplied to the inductor L through a current path bypassing at least a portion of the plurality of transistors TR1-TR8 using the first to third capacitors C1-C3, and accordingly, the number of transistors included in each current path may be reduced.

In addition, since the currents I1-I3 required to charge energy in the inductor L are distributed through three current paths and supplied to the inductor L, the burden on transistors included in each current path may be reduced, and the DC-DC converter 100 may be implemented with transistors having a relatively small size.

Referring to FIG. 4 illustrating the equivalent circuit of the DC-DC converter 100 for the first time, the second capacitor C2 and the third capacitor C3 may be connected to each other in parallel, and the first capacitor C1 may be connected to the second capacitor C2 and the third capacitor C3 in series. Alternatively or additionally, the LC filter may be connected to a node between the first capacitor C1 and the third capacitor C3. Accordingly, voltages of the first to third capacitors C1-C3 during the first time period may be represented by Eq. 1 below.

$$VIN = VC1 + VC2 = VC1 + VC3 \qquad \text{[Eq. 1]}$$

Referring to FIG. 5, as described above, during the second time period, the first to fourth transistors TR1-TR4 in the DC-DC converter 100 may be turned off and the fifth to eighth transistors TR5-TR8 may be turned on. Accordingly, during the second time period, the first to third capacitors C1-C3 are connected to each other, and the first capacitor C1 is discharged, while the second and third capacitors C2 and C3 may be charged.

Referring to FIG. 6 illustrating the equivalent circuit of the DC-DC converter 100 during the second time period, the first to third capacitors C1-C3 may be connected to each other in series, and the inductor L may be connected to a ground node. Accordingly, voltages of the first to third capacitors C1-C3 during the second time period may be expressed as Eq. 2 below.

$$VC1=VC2+VC3 \quad \text{[Eq. 2]}$$

Referring to Equations 1 and 2 together, the voltages of the second capacitor C2 and the third capacitor C3 may have a level corresponding to a third of the input voltage, and the voltage of the first capacitor C1 may have a level corresponding to two-thirds of the input voltage. Accordingly, the output voltage VOUT output through the LC filter may be determined between one-third of the input voltage and the ground voltage. For example, within one period of the DC-DC converter 100, the level of the output voltage VOUT may vary according to lengths of the first time period and the second time period, respectively.

In an example embodiment, as the first time period becomes longer and the second time period becomes shorter, the output voltage VOUT may have a level closer to one-third of the input voltage. Alternatively or additionally, as the first time period is shortened and the second time period is increased, the output voltage VOUT may have a level closer to the ground voltage.

Unlike the first time period, during the second time period, since the first capacitor C1 is discharged and the second and third capacitors C2 and C3 are charged, a voltage of each of the first to third capacitors C1-C3 may be constantly maintained without a separate feedback circuit, which is described below with reference to FIGS. 7A to 7C.

Figure 7A:
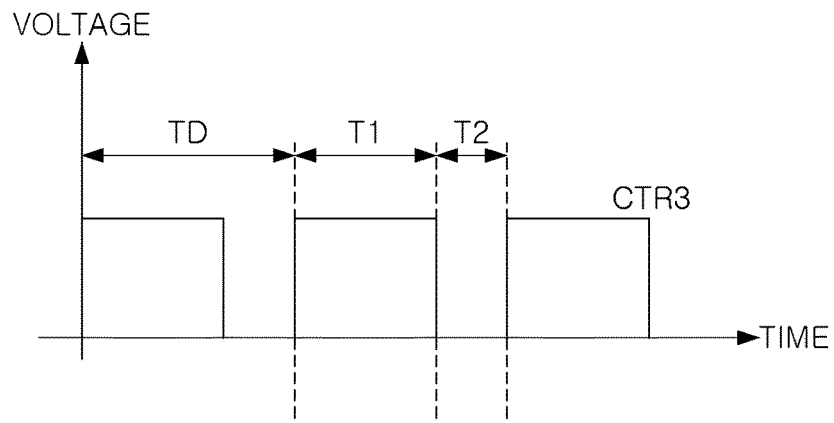
FIGS. 7A to 7C are graphs illustrating the operation of a DC-DC converter according to various example embodiments.
Figure 7B:
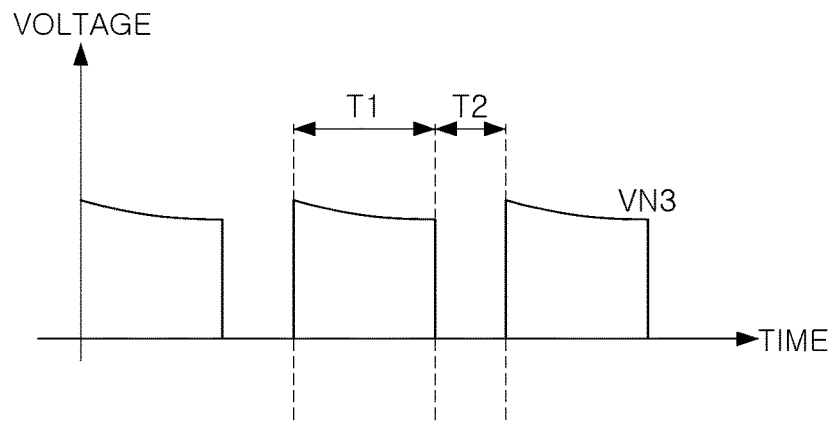
Figure 7C:
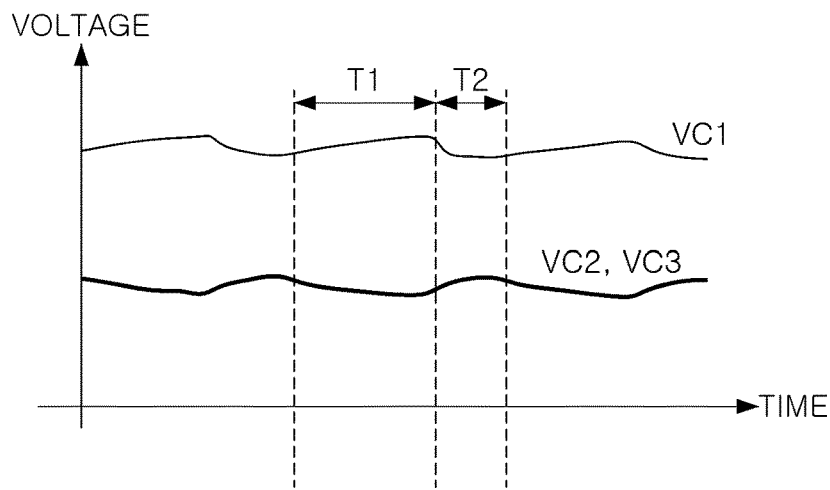

FIGS. 7A to 7C are graphs illustrating the operation of a DC-DC converter according to an example embodiment.

FIG. 7A is a graph illustrating one of the control signals (e.g., CTR3) input to the DC-DC converter 100. FIG. 7B is a graph schematically illustrating the voltage of the third node N3 (e.g., VN3), and FIG. 7C is a graph schematically illustrating voltages of each of the first to third capacitors C1-C3 (e.g., VC1-VC3, respectively).

The switching on and/or switching off of the plurality of transistors TR1-TR8 included in the DC-DC converter 100 may be determined by control signals CTR1-CTR8 output from the control circuit. For example, the control circuit may match the first to eighth control signals CTR1-CTR8 to the plurality of transistors TR1-TR8, respectively, and output the signals. FIG. 7A is a graph schematically illustrating the third control signal CTR3 supplied to the third transistor TR3 from among the plurality of transistors TR1-TR8. For example, in some embodiments, the first control signal CTR1 supplied to the first transistor TR1 may be the same as the third control signal CTR3.

Referring to FIGS. 7A to 7C, the DC-DC converter 100 may operate according to a predetermined period TD. One period TD includes a first time period T1 and a second time period T2. The first time period T1 may be the time when energy is charged in the inductor L, and the second time period T2 may be a time during which energy charged in the inductor L is discharged.

FIG. 7B is a graph illustrating the voltage of the third node N3, and the third node N3 may be a node to which the first capacitor C1, the inductor L, the second transistor TR2, and the eighth transistor TR8 are connected to each other, as described with reference to FIGS. 3 to 6. During the first time period T1, the second transistor TR2 is turned on, and the voltage of the third node N3 may be the same as the voltage of the second capacitor C2.

Accordingly, as described above with reference to Equation 1, the voltage of the third node N3 during the first time period T1 may be determined to have a level corresponding to one-third of the input voltage VIN. Alternatively or additionally, during the second time period T2, the second transistor TR2 may be turned off and the eighth transistor TR8 may be turned on. Accordingly, during the second time period T2, the third node N3 may be connected to the ground node, and the voltage of the third node N3 may be determined as the ground voltage.

FIG. 7C is a graph illustrating respective voltages of the first to third capacitors C1-C3. As described above with reference to Equations 1 and 2, the voltage VC1 of the first capacitor C1 may have a level corresponding to two-thirds of the input voltage VIN. Alternatively or additionally, the voltage VC2 of the second capacitor C2 and the voltage VC3 of the third capacitor C3 may have a level corresponding to one-third of the input voltage VIN.

Alternatively or additionally, during the first time period T1, the first capacitor C1 may be charged, and the second capacitor C2 and the third capacitor C3 may be discharged. Accordingly, as illustrated in FIG. 7C, the voltage VC1 of the first capacitor C1 may be slightly increased during the first time period T1, and the voltage VC2 of the second capacitor C2 and the voltage VC3 of the third capacitor C3 may be slightly decreased.

During the second time period T2, the first to third capacitors C1-C3 may be connected to each other in series as described above with reference to FIG. 6. During the second time period T2, the first capacitor C1 may be discharged, and the second capacitor C2 and the third capacitor C3 may be charged. Thus, as illustrated in FIG. 7C, the voltage VC1 of the first capacitor C1 may be slightly decreased, and the voltage VC2 of the second capacitor C2 and the voltage VC3 of the third capacitor C3 may slightly increase.

As described with reference to FIG. 7C, in an example embodiment, voltages of the first to third capacitors C1-C3 may be constantly maintained without a separate feedback circuit. Therefore, the structure of the DC-DC converter 100 may be simplified, and the number of elements required to implement the DC-DC converter 100 may be reduced.

Alternatively or additionally, each of the control signals CTR1-CTR8 input to the plurality of transistors TR1-TR8 may be a square wave signal. However, the actual control signals CTR1-CTR8 may have a predetermined slew rate, and as a result, at least some of the control signals CTR1-CTR8 may not have a perfect square wave waveform. Accordingly, before at least one of the first to fourth transistors TR1-TR4 is completely turned off between the first time period T1 and the second time period T2 within one period TD, at least one of the fifth to eighth transistors TR5-TR8 may be turned on. Alternatively or additionally, between the second time period T2 of a first period TD and the first time period T1 of second period TD immediately after the first period TD, at least one of the first to fourth transistors TR1-TR4 may be turned on before at least one of the fifth to eighth transistors TR5-TR8 is completely turned off.

In a case in which at least one of the first to fourth transistors TR1-TR4 and at least one of the fifth to eighth transistors TR5-TR8 are simultaneously turned on between the first time period T1 and the second time period T2, a current path may be generated that directly connects the input node and the ground node. Alternatively or additionally, while the DC-DC converter 100 is operating, nodes that should not be directly connected to each other may be connected to each other, and thus, an unintended charge loss may occur in at least one of the first to third capacitors C1-C3.

Figure 8:
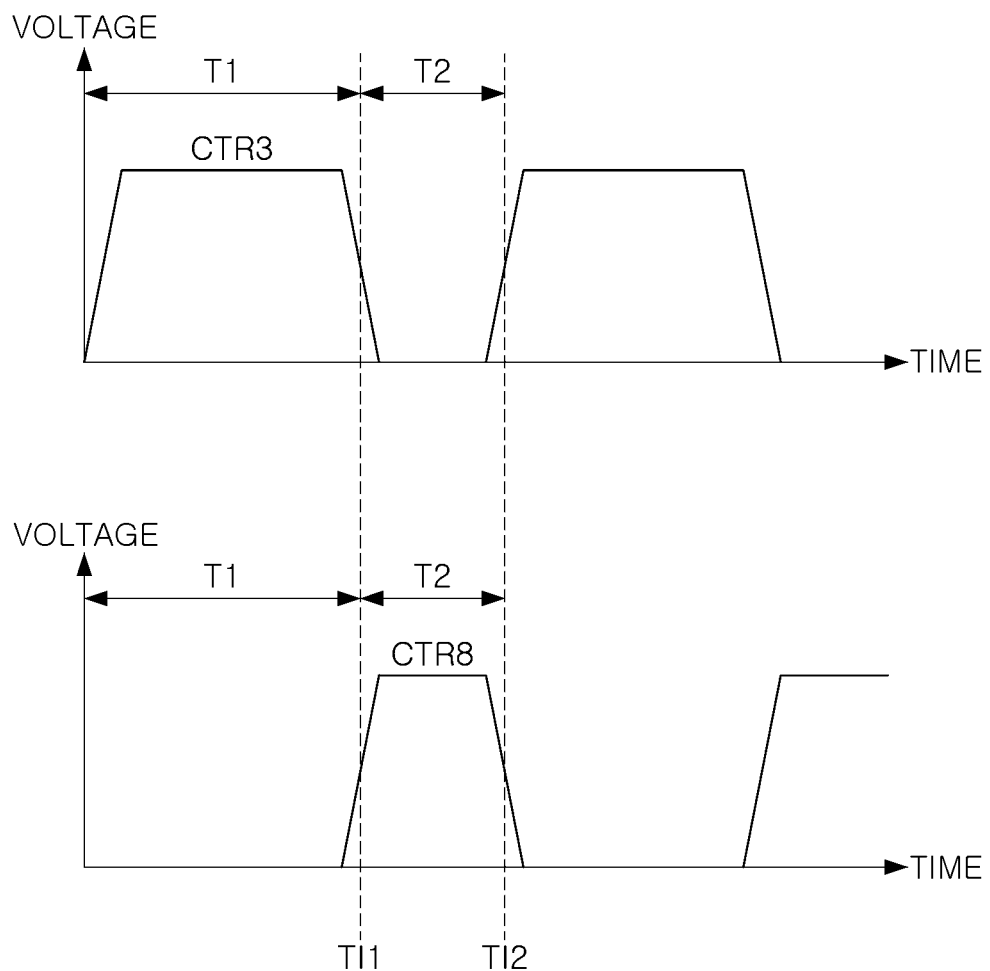
FIGS. 8 and 9 are diagrams illustrating the operation of a DC-DC converter according to various example embodiments.
Figure 9:
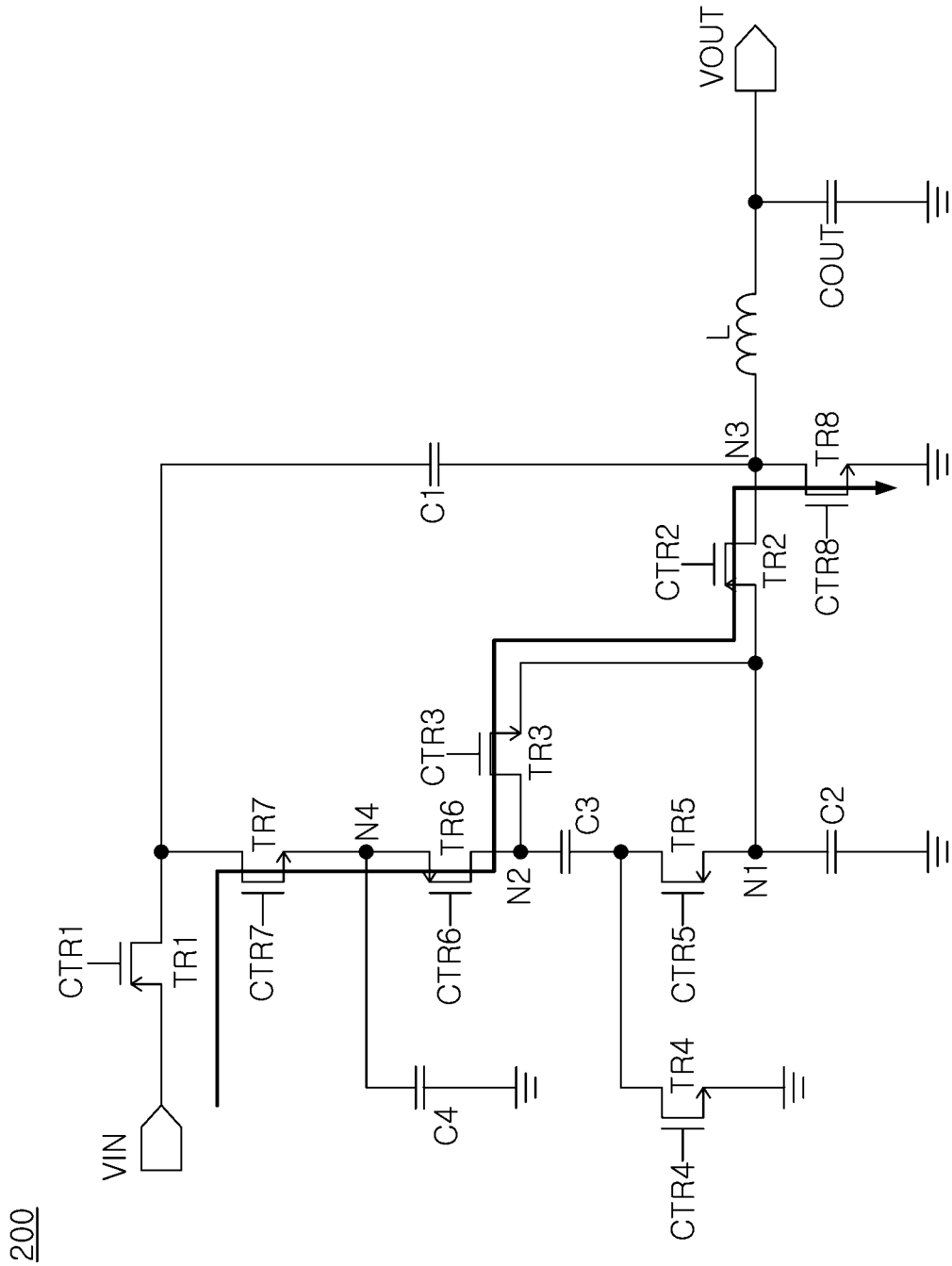

FIGS. 8 and 9 are diagrams illustrating the operation of the DC-DC converter according to an example embodiment.

First, FIG. 8 is a graph schematically illustrating some of the control signals input to the DC-DC converter according to an example embodiment. FIG. 9 is a circuit diagram schematically illustrating a DC-DC converter 200 according to an example embodiment. The DC-DC converter 200 illustrated in FIG. 9 may have a structure similar to the DC-DC converter 100 described with reference to FIG. 2 above, and therefore, a detailed description of the structure of the DC-DC converter 200 will be omitted.

Referring to FIG. 8, each of the control signals CTR1-CTR8 input to the plurality of transistors TR1-TR8 of the DC-DC converter 200 may be a square wave signal having a predetermined slew rate. For example, the third control signal CTR3 is a square wave signal having a duty ratio of 50% or more, and the eighth control signal CTR8 may be a square wave signal having a duty ratio of 50% or less. Both the third transistor TR3, to which the third control signal CTR3 is input, and the eighth transistor TR8, to which the eighth control signal CTR8 is input, may be NMOS transistors.

In some embodiments, the eighth transistor TR8 may be turned off during the first time period T1 when the third transistor TR3 is turned on, and, during the second time period T2 when the eighth transistor TR8 is turned on, the third transistor TR3 may be turned off. However, as illustrated in FIG. 8, both the third control signal CTR3 and the eighth control signal CTR8 may have a predetermined slew rate, and, as such, the third transistor TR3 and the eighth transistor TR8 may be simultaneously turned on between the first time period T1 and the second time period T2. For example, the third transistor TR3 and the eighth transistor TR8 may be simultaneously turned on at a first intermediate time point TI1 and/or a second intermediate time point TI2. A similar phenomenon may also occur for other transistors.

In the DC-DC converter 200, the first to fourth transistors TR1-TR4 may be turned on for a first time period T1, and the fifth to eighth transistors TR5-TR8 may be turned on for a second time period T2. However, while progressing from the first time period T1 to the second time period T2, at least one of the fifth to eighth transistors TR5-TR8 may be turned on before all of the first to fourth transistors TR1-TR4 are turned off. Alternatively or additionally, while proceeding from the second time period T2 to the first time period T1, at least one of the first to fourth transistors TR1-TR4 may be turned on before all of the fifth to eighth transistors TR5-TR8 are turned off.

In this case, a current path in which the input node and the ground node are directly connected may be generated. For example, when the first to third transistors TR1-TR3 and the sixth to eighth transistors TR6-TR8 are simultaneously turned on between the first time period T1 and the second time period T2, a current path in which the input node and the ground node are directly connected may be generated as illustrated in FIG. 9.

In an example embodiment of the present disclosure, the on/off switching timing of each of the plurality of transistors TR1-TR8 may be adjusted to reduce a likelihood that the above problem occurs. Hereinafter, an on/off switching control operation of the plurality of transistors TR1-TR8 is described with reference to FIGS. 10 to 16.

FIGS. 10 to 16 are diagrams illustrating the operation of the DC-DC converter according to an example embodiment.

In the example embodiment described with reference to FIGS. 10 to 16, a DC-DC converter 300 operates according to a predetermined cycle, and one period may include a first time period and a second time period. The DC-DC converter 300 illustrated in FIGS. 10 to 16 may have a structure similar to the DC-DC converter 100 described with reference to FIG. 2 and the DC-DC converter 200 described in reference to FIG. 9, and therefore, a detailed description of the structure of the DC-DC converter 300 will be omitted.

The first time period may be a time period when energy is charged in the inductor L, and the second time period may be a time period when energy charged in the inductor L is discharged.

Figure 10:
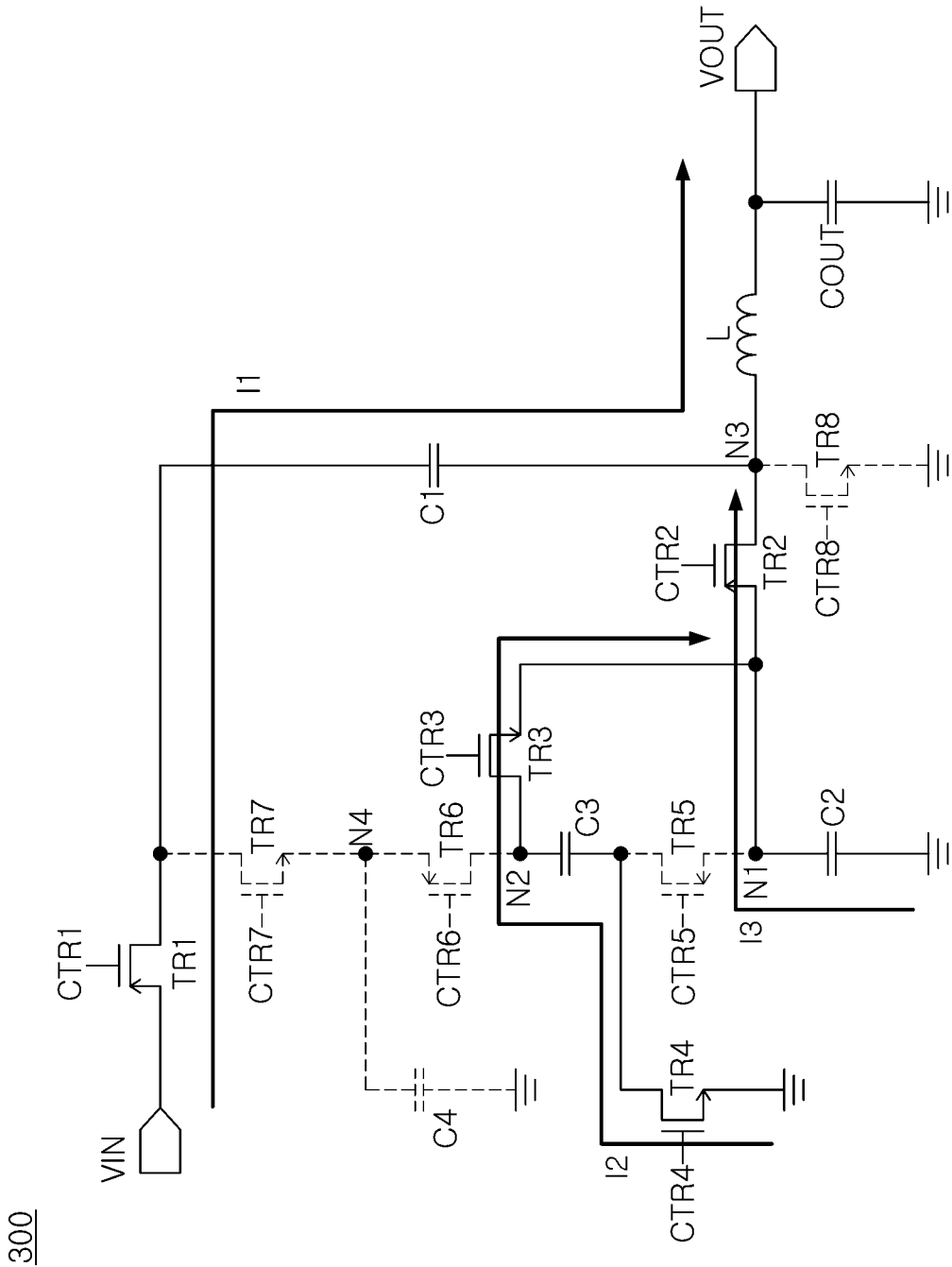
FIGS. 10 to 16 are diagrams illustrating the operation of a DC-DC converter according to various example embodiments.

FIG. 10 is a diagram illustrating on/off states of the plurality of transistors TR1-TR8 included in the DC-DC converter 300 during the first time period. Referring to FIG. 10, the first to fourth transistors TR1-TR4 may be turned on and the fifth to eighth transistors TR5-TR8 may be turned off for a first time period. During the first time period, the first capacitor C1 may be charged and the second capacitor C2 and the third capacitor C3 may be discharged, and energy may be charged in the inductor L with currents I1-I3 flowing through the three current paths.

In the example embodiment illustrated in FIGS. 10 to 16, to accurately control the on/off switching timing of the plurality of transistors TR1-TR8, elapsed times may be defined between the first time period and the second time period. For example, a first elapsed time and a second elapsed time may be defined in a section in which the first time period (e.g., T1) ends and the second time period (e.g., T2) starts within one period (e.g., TD). Each of the first elapsed time and the second elapsed time may be a time overlapping with at least one of the first time period and the second time period. Similarly, assuming the first time period and the second time period are adjacent to each other, in a section in which the second time period (e.g, T2) of a first period (e.g., TD) ends and the first time period (e.g., T1) of the second period (e.g., TD) begins, a third elapsed time and a fourth elapsed time may be defined. The third elapsed time may overlap the second time period of the first period, and the fourth elapsed time may overlap the first time period of the second period.

Figure 11:
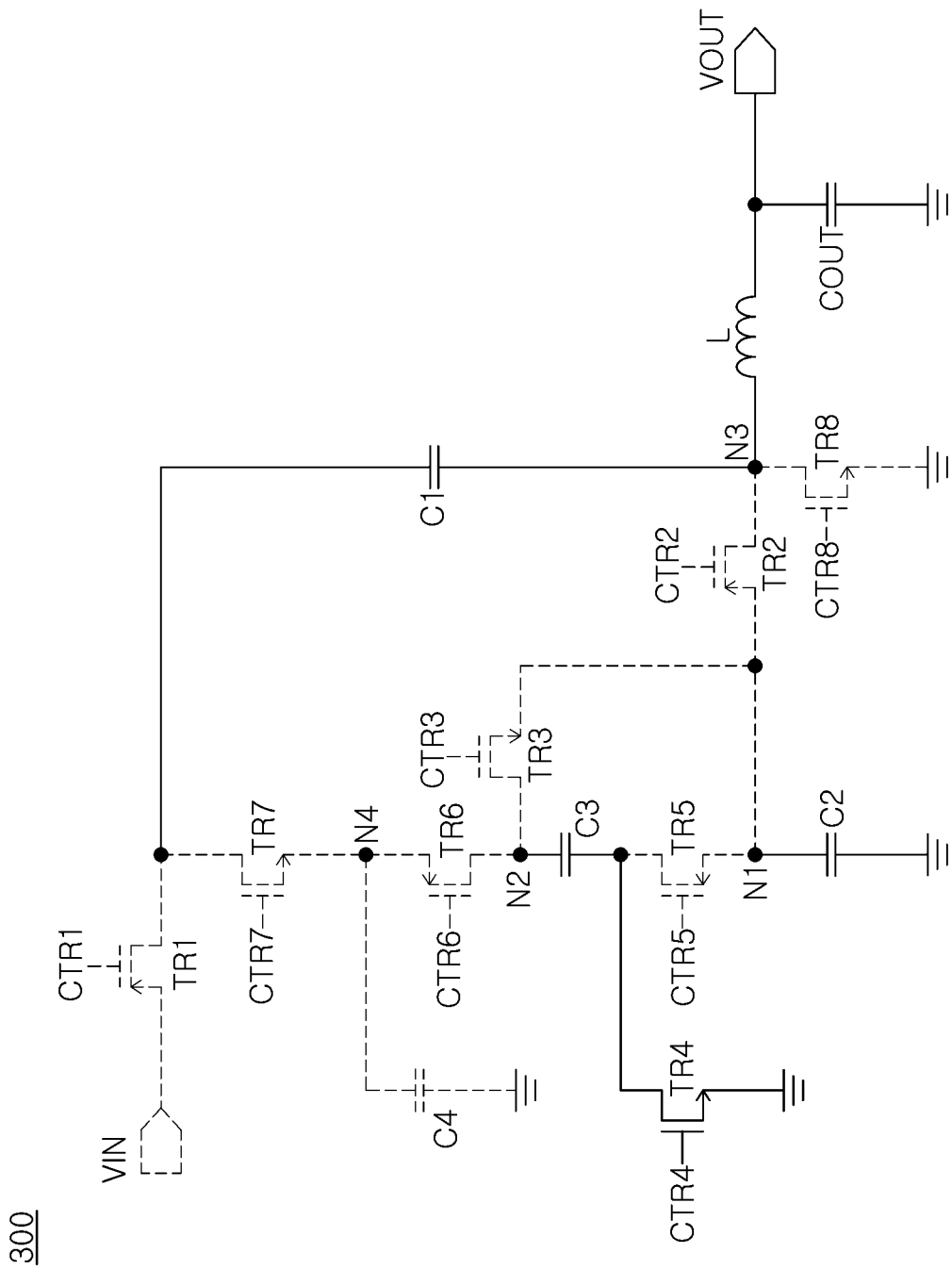
Figure 12:
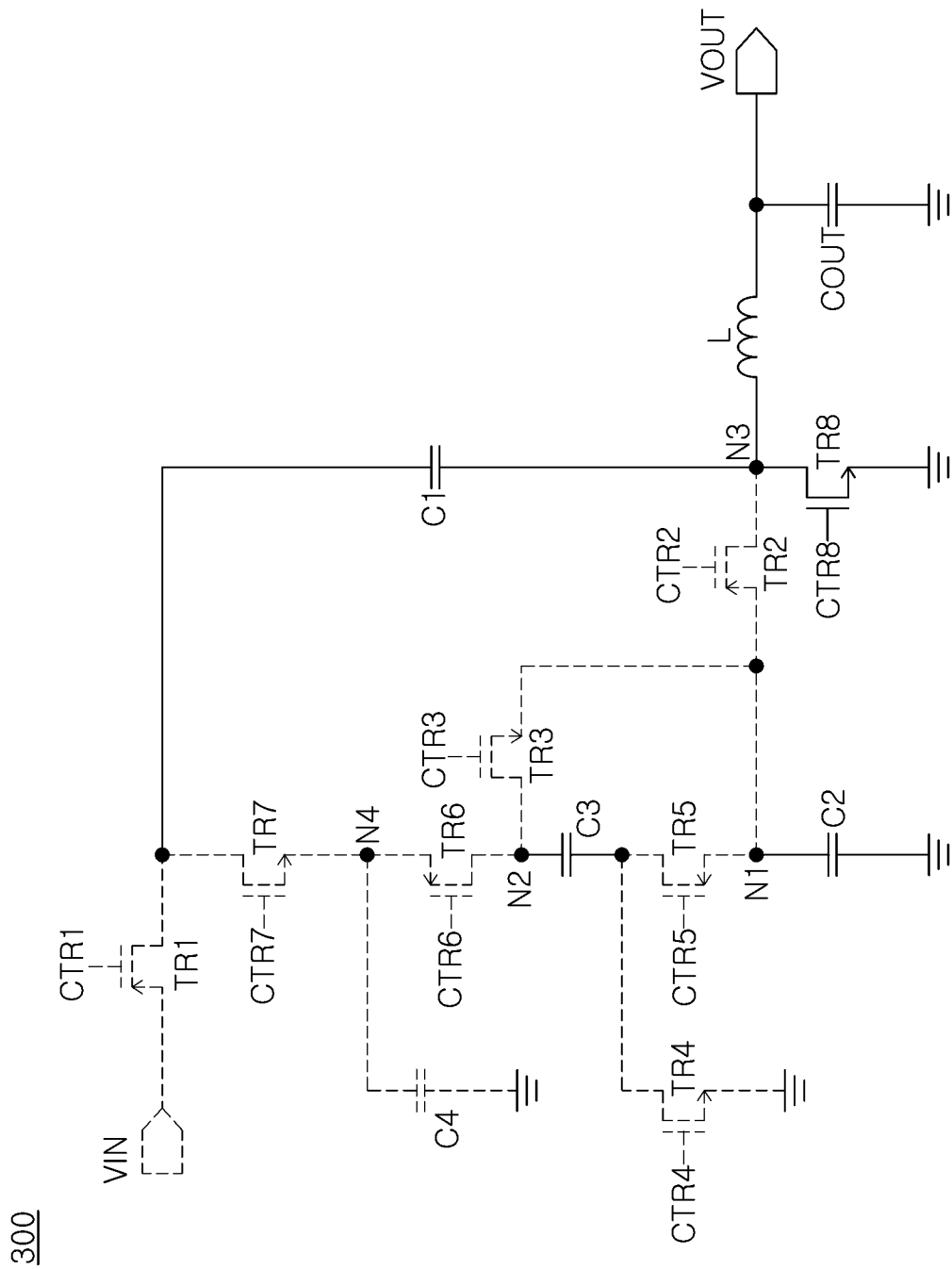
Figure 14:
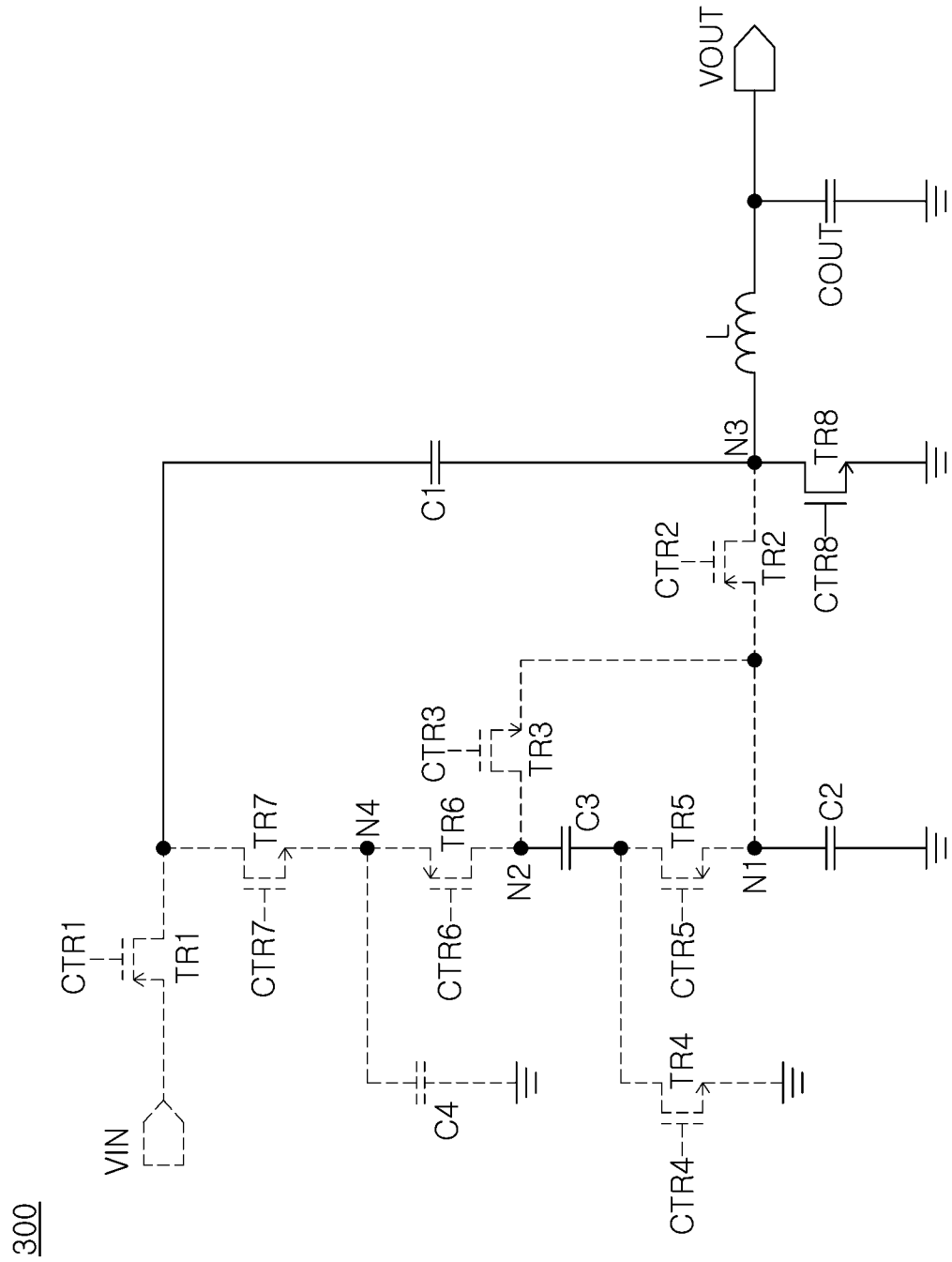
Figure 15:
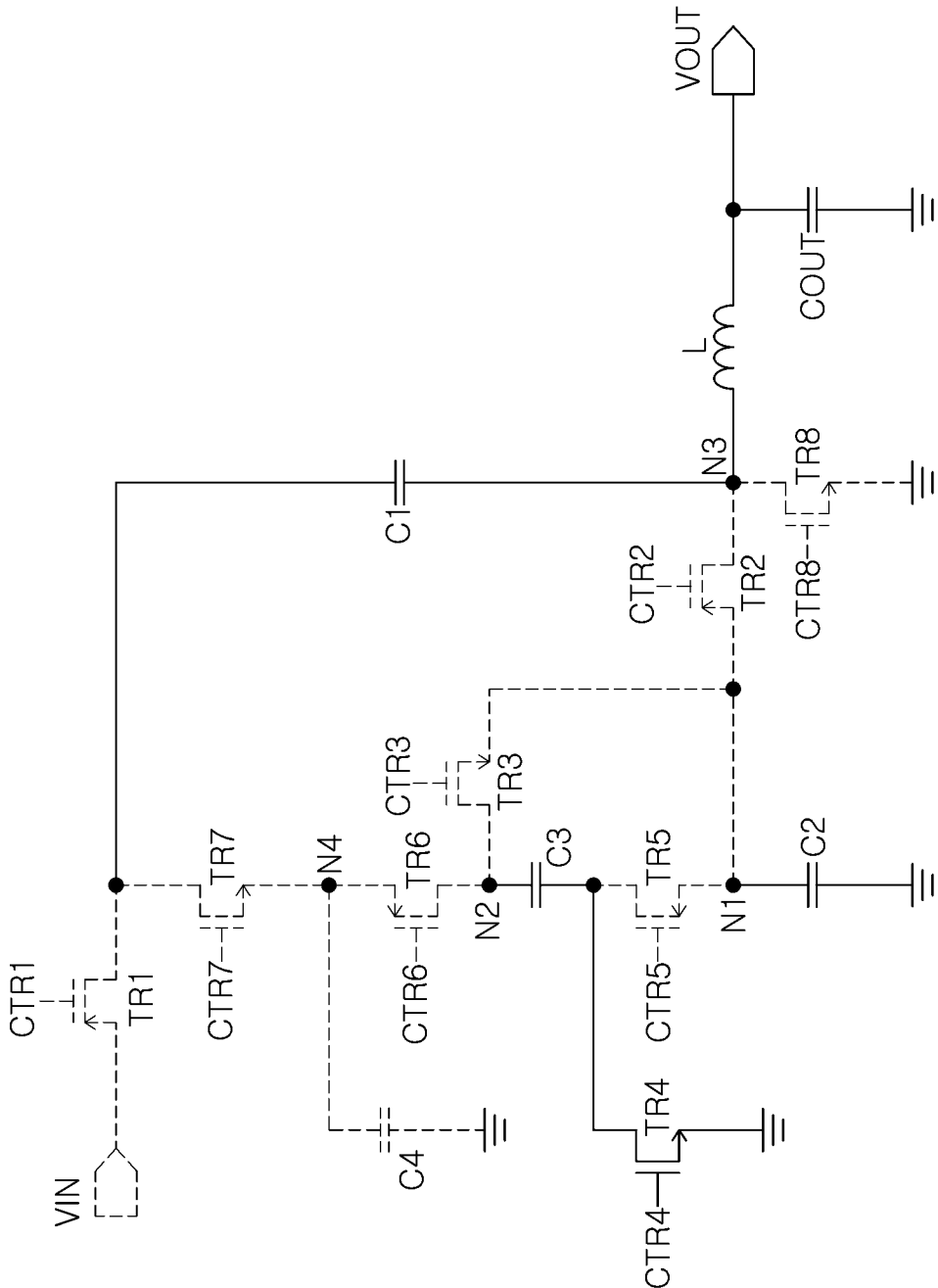

As an example, FIG. 11 is a diagram illustrating the operation of the DC-DC converter 300 during the first elapsed time, and FIG. 12 is a diagram illustrating an operation of the DC-DC converter 300 during the second elapsed time. FIG. 14 is a view illustrating the operation of the DC-DC converter 300 during the third elapsed time, and FIG. 15 is a view illustrating the operation of the DC-DC converter 300 during the fourth elapsed time.

Referring first to FIG. 11, during the first elapsed time, the first transistor TR1, the second transistor TR2, and the third transistor TR3 may enter a turned off state. During the first elapsed time, the fourth transistor TR4 may still maintain a turned on state. As the first to third transistors TR1-TR3 are turned off, all current paths supplying current to the inductor L may be blocked. Referring to FIG. 12, the fourth transistor TR4 may be turned off during the second elapsed time.

Figure 13:
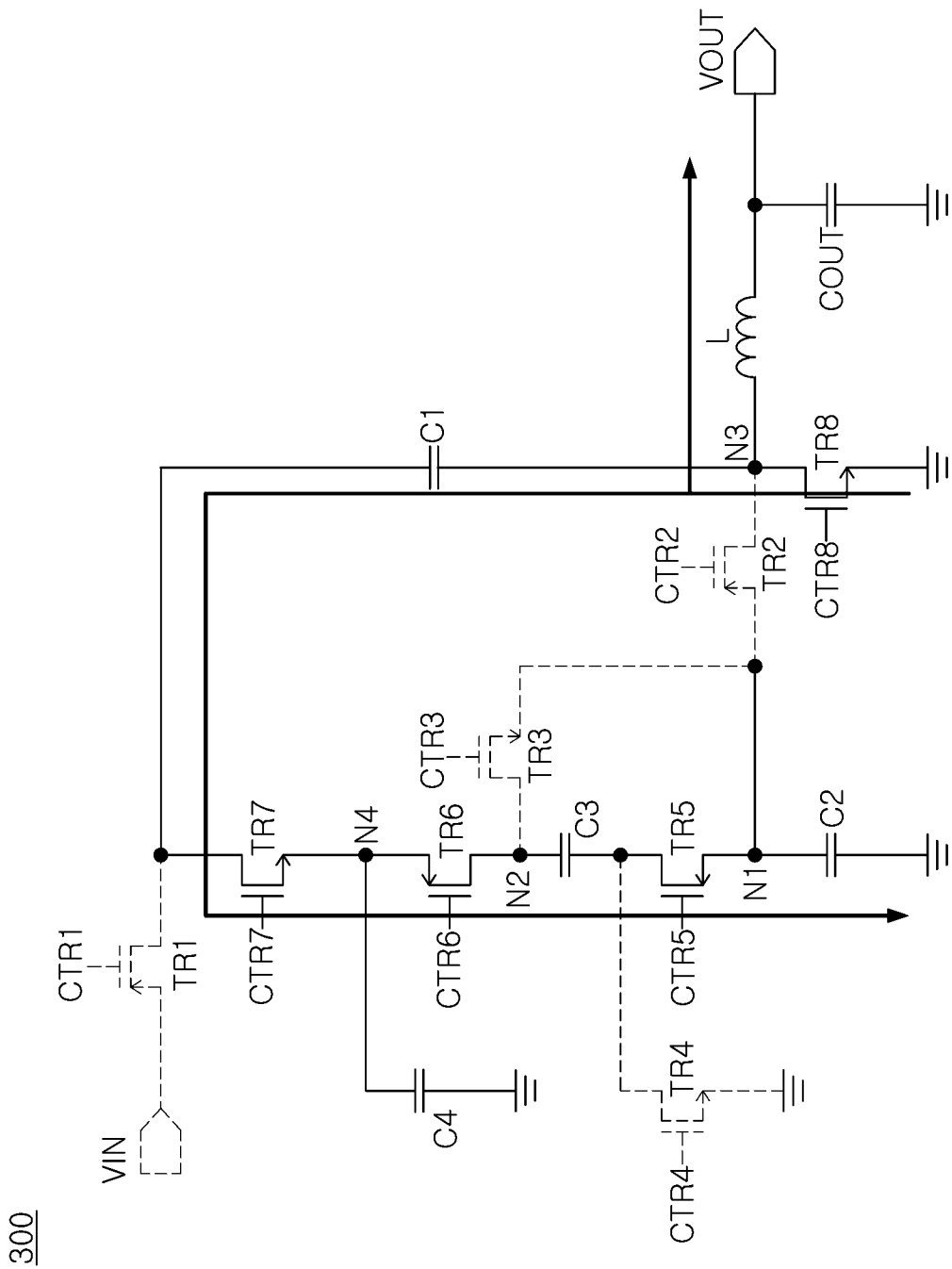

FIG. 13 is a diagram illustrating an on/off state of the plurality of transistors TR1-TR8 included in the DC-DC converter 300 during a second time period after both the first elapsed time and the second elapsed time have elapsed. Referring to FIG. 13, the first to fourth transistors TR1-TR4 may be turned off and the fifth to eighth transistors TR5-TR8 may be turned on during the second time period. During the second time period, the first to third capacitors C1-C3 are connected to each other in series, and the energy charged in the inductor L during the first time period may be discharged during the second time period.

As described above with reference to FIGS. 5 and 6, each voltage of the second capacitor C2 and the third capacitor C3 may be maintained at a level corresponding to a third of the input voltage during the second time period. Alternatively or additionally, the voltage of the first capacitor C1 may be maintained at a level corresponding to two-thirds of the input voltage. Accordingly, the voltage of the first node N1 may be VIN/3, and the voltage of the second node N2 may be 2*VIN/3. The voltage at the fourth node N4, at which the sixth transistor TR6, the seventh transistor TR7, and the fourth capacitor C4 are connected to each other, may be the same as the voltage of the second node N2.

When the second time period has elapsed within one period, the first time period may start again in the next one period. As described above, in the successive first and second periods, the third elapsed time and the fourth elapsed time may be defined in a section in which the second time period of the first period ends and the first time period of the second period begins. The third elapsed time may be a time included in the first period, and the fourth elapsed time may be a time included in the second period.

Referring to FIG. 14, the fifth to seventh transistors TR5-TR7 may be turned off during the third elapsed time. Accordingly, the third capacitor C3 and the second capacitor C2 may be separated from each other, and the voltage of the first node N1 may be maintained at VIN/3. Voltages at the fourth node N4, where the sixth transistor TR6, the seventh transistor TR7, and the fourth capacitor C4 are connected to each other, and at the second node N2 may be maintained at 2*VIN/3.

Figure 16:
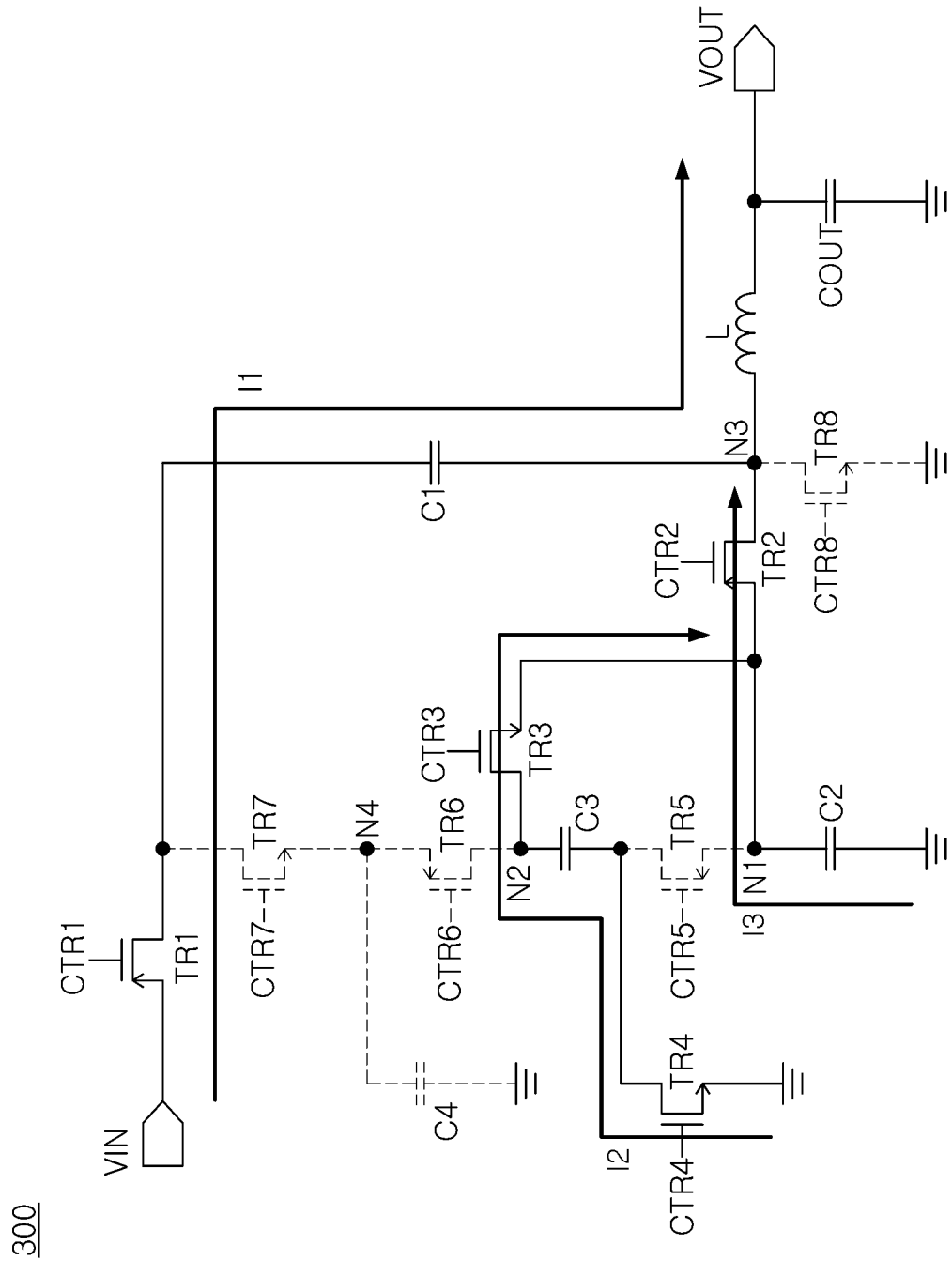

Referring to FIG. 15, the eighth transistor TR8 may be turned off and the fourth transistor TR4 may be turned on during the fourth elapsed time Immediately after the fourth elapsed time, the first to third transistors TR1-TR3 are turned on, and as illustrated in FIG. 16, three current paths (e.g., I1-I3) are generated to charge energy in the inductor L. For example, the operation of the DC-DC converter 300 during the third elapsed time may be the same as the operation of the DC-DC converter 300 during the second elapsed time, and the operation of the DC-DC converter 300 during the fourth elapsed time may be the same as that of the DC-DC converter 300 during the first elapsed time.

As described with reference to FIGS. 10 to 16, by adjusting the on/off switching timing of the transistors TR1-TR8 by setting predetermined elapsed times in the respective sections from the first time period to the second time period and from the second time period to the first time period, the input node may be prevented from being directly connected to the ground node. In addition, by significantly reducing the loss due to charge sharing between the second capacitor C2 and the third capacitor C3, the voltage of each of the second capacitor C2 and the third capacitor C3 may be maintained at a required level (e.g., VIN/3) and the voltage of the fourth capacitor C4 may be maintained at 2*VIN/3.

In an example embodiment, assuming that one period of the DC-DC converter 300 is 1 micro-second (e.g., 1 μsec), the first time period and the second time period may vary depending on the level of the output voltage VOUT. Alternatively or additionally, setting each of the first to fourth elapsed times to a value equivalent to several nano-seconds (e.g., 1-10 nsec) may be sufficient to prevent the input node and the output node from being directly connected and/or to reduce the charge sharing loss caused by the direct connection of the second capacitor C2 and the third capacitor C3 (e.g., the flying capacitors). For example, the sum of the first to fourth elapsed times may be set to 5% or less of one period of the DC-DC converter 300. In optional or additional embodiments, the first to fourth elapsed times may be set to the same time.

The control signals CTR1-CTR8 controlling the plurality of transistors TR1-TR8 may be generated by a control circuit provided separately from the DC-DC converter 300. Alternatively or additionally, the control circuit may include an active element. In such embodiments, a predetermined power supply voltage may be required for the operation of the control circuit. In an example embodiment, a voltage output at a constant level during operation of the DC-DC converter 300 may be supplied as a power supply voltage of the control circuit. For example, the voltage of the fourth node N4, to which the sixth transistor TR6, the seventh transistor TR7 and the fourth capacitor C4 are connected to each other, may be supplied to the control circuit as a power supply voltage. The voltage of the fourth node N4 may be maintained at a level of 2*VIN/3 during the operation of the DC-DC converter 300 as described above. As such, the power voltage required for the operation of the control circuit only may be secured with the input voltage VIN input to the DC-DC converter 300 without the need for a separate power supply.

For example, the fourth node N4 may receive a current by the input voltage VIN, and may also supply a current to the first node N1. The current supplied by the input voltage VIN and the current flowing out to the first node N1 may be small in magnitude and may cancel each other out, and accordingly, the voltage of the fourth node N4 may not have a significant effect on maintaining the level of 2*VIN/3.

In some embodiments, when the seventh transistor TR7 is turned off, the voltage of the fourth node N4 may be affected by parasitic capacitance of the seventh transistor TR7. Alternatively or additionally, when the sixth transistor TR6 is turned off, the voltage of the fourth node N4 may be affected by parasitic capacitance of the sixth transistor TR6. However, until the sixth transistor TR6 and the seventh transistor TR7 are completely turned off, since the fourth node N4 is connected to the second capacitor C2 and the third capacitor C3 having a larger capacity than the fourth capacitor C4, parasitic capacitance of the sixth transistor TR6 and the seventh transistor TR7 may also not significantly affect the voltage of the fourth node N4.

Alternatively or additionally, the parasitic capacitance of the first transistor TR1 and the third transistor TR3 may significantly affect the voltage of the fourth node N4. Parasitic capacitance of each of the first transistor TR1 and the third transistor TR3 may affect the voltage of the fourth node N4 when the first transistor TR1 and the third transistor TR3 are turned on. When the first transistor TR1 and the third transistor TR3 are turned on, since other transistors connected to the fourth node N4 (e.g., the sixth transistor TR6 and the seventh transistor TR7) are turned off, the voltage of the fourth node N4 may increase or decrease due to parasitic capacitance.

In an example embodiment, the first transistor TR1 and the third transistor TR3 may be formed to have the same or similar size to stably maintain the voltage at the fourth node N4. In such an embodiment, the current supplied from the parasitic capacitance of the first transistor TR1 to the fourth node N4, and the current flowing out from the fourth node N4, as the parasitic capacitance of the third transistor TR3, may have similar magnitudes. As a result, the voltage of the fourth node N4 may be stably maintained by canceling the effects of the first transistor TR1 and the third transistor TR3.

Figure 17:
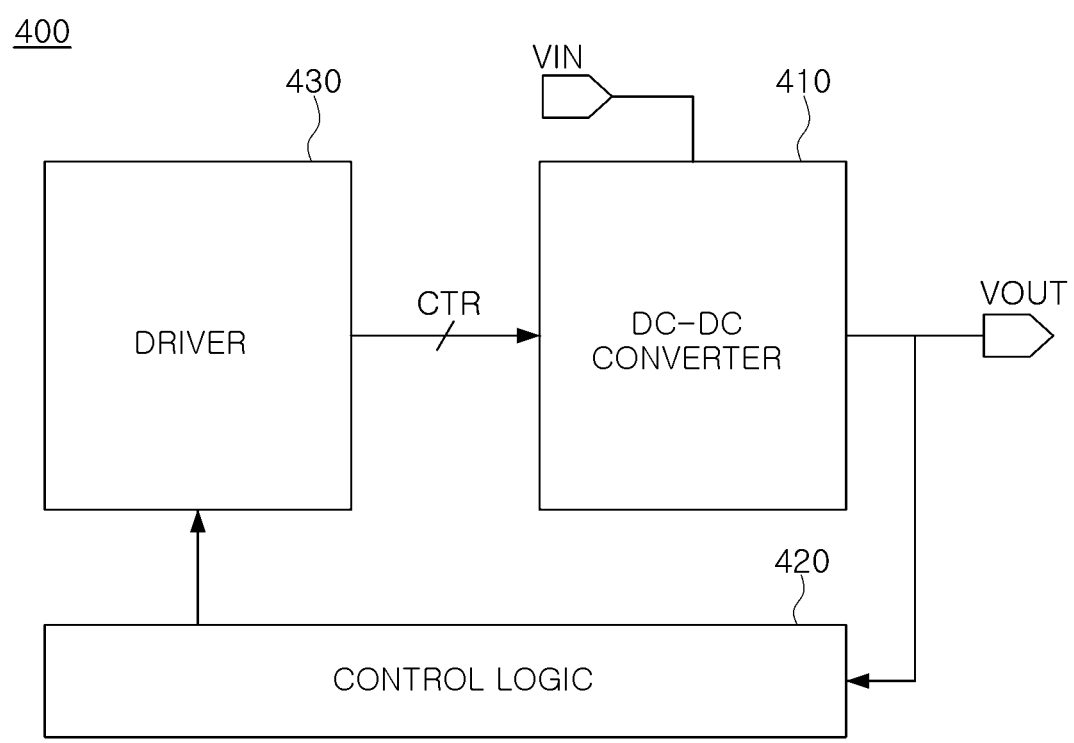
FIG. 17 is a block diagram schematically illustrating a power supply device according to various example embodiments.

FIG. 17 is a block diagram schematically illustrating a power device according to an example embodiment.

Referring to FIG. 17, a power supply 400 according to an example embodiment may include a DC-DC converter 410, a control logic 420, a driver 430, and the like. The DC-DC converter 410 may step-down an input voltage VIN to output an output voltage VOUT, and may be implemented according to at least one of the example embodiments described above with reference to FIGS. 1 to 16. For example, the DC-DC converter 410 may include a switched capacitor circuit including a plurality of transistors and a plurality of capacitors, and an LC filter connected to the switched capacitor circuit.

The control logic 420 and the driver 430 may be included in one control circuit. The control logic 420 may receive the output voltage VOUT of the DC-DC converter 410 and output a pulse width modulation (PWM) signal to the driver 430. The driver 430 may adjust the duty ratio of the control signals CTR for controlling the plurality of transistors included in the DC-DC converter 410 by using the PWM signal received from the control logic 420. For example, the output voltage VOUT may be determined according to the duty ratio of each of the PWM signal output by the control logic 420 and the control signals CTR output by the driver 430, and the ratio of the input voltage VIN to the output voltage VOUT may be changed.

A predetermined power supply voltage may be required for the operation of the active elements included in the control logic 420 and the driver 430. In an example embodiment, the control logic 420 and the driver 430 may use at least one of voltages generated while the DC-DC converter 410 receives the input voltage VIN and operates as a power supply voltage.

Hereinafter, the operation of the power supply device according to an example embodiment is described in more detail with reference to FIG. 18.

Figure 18:
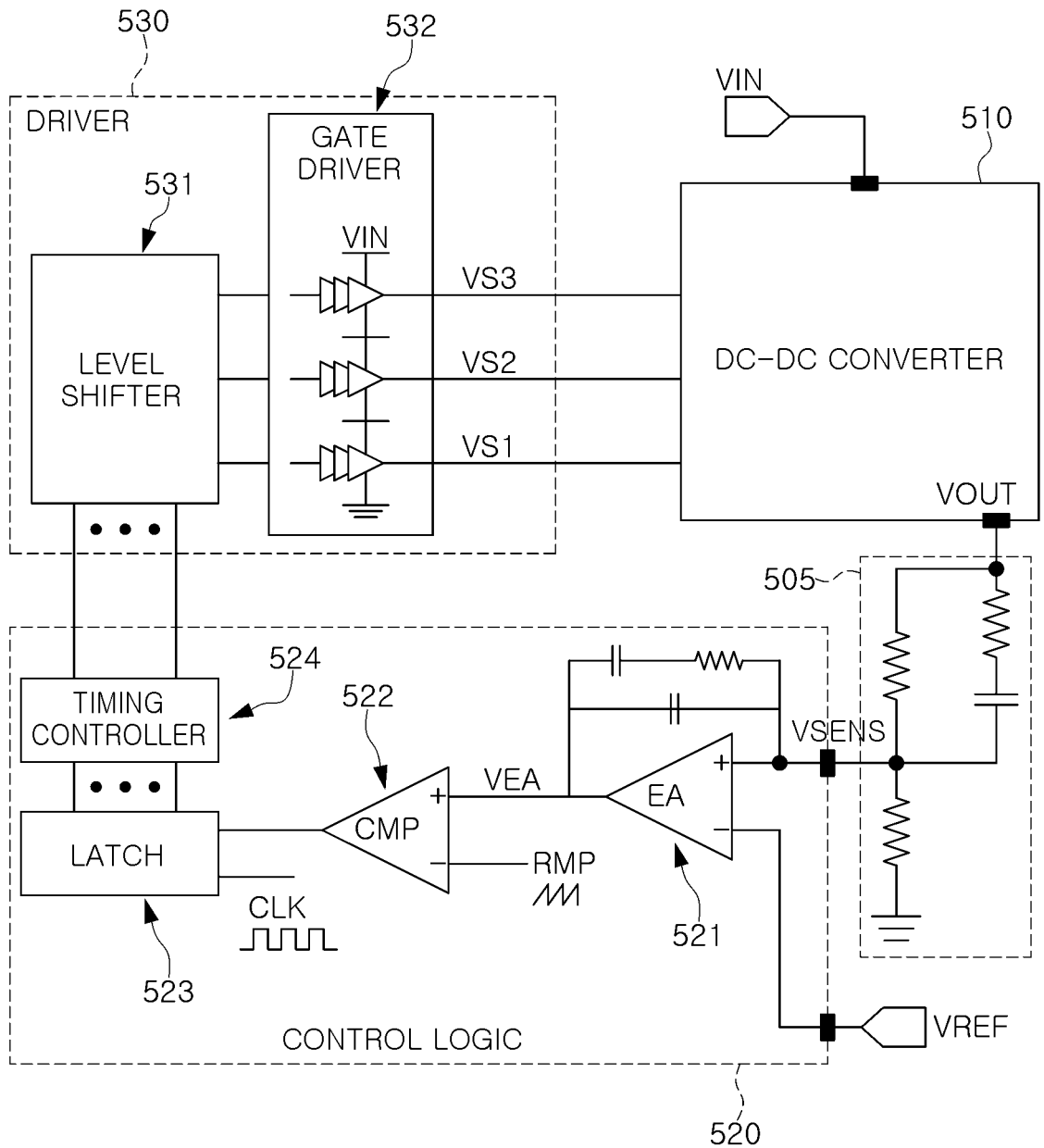
FIG. 18 is a diagram schematically illustrating a power supply device according to various example embodiments.

FIG. 18 is a diagram schematically illustrating a power supply device according to an example embodiment.

Referring to FIG. 18, a power supply device 500 according to an example embodiment may include a DC-DC converter 510, a control logic 520, and a driver 530. The DC-DC converter 510 may be a circuit that steps down the input voltage VIN to output the output voltage VOUT, and the output voltage VOUT may be input to the control logic 520 through a voltage divider circuit 505. The voltage divider circuit 505 includes a plurality of resistors and at least one capacitor, and may output a sensing voltage VSENS determined by the output voltage VOUT to the control logic 520.

The control logic 520 may include an error amplifier 521, a comparator 522, a latch 523, a timing controller 524, and the like. The error amplifier 521 may amplify the difference voltage between the sensing voltage VSENS and a reference voltage VREF to output an error voltage VEA. For example, when the difference between the sensing voltage VSENS and the reference voltage VREF increases as the output voltage VOUT increases, the magnitude of the error voltage VEA may also increase.

The comparator 522 may receive the error voltage VEA and a ramp voltage RMP and output a square wave signal. For example, referring to FIG. 18, the error voltage VEA may be input to an inverting terminal of the comparator 522, and the ramp voltage RMP may be input to a non-inverting terminal of the comparator 522. In the example embodiment illustrated in FIG. 18, as the magnitude of the error voltage VEA increases, the duty ratio of the square wave signal output from the comparator 522 may decrease.

The latch 523 and the timing controller 524 may generate a PWM signal using the output of the comparator 522. As an example, the timing controller 524 may output a PWM signal of a duty ratio capable of significantly reducing the fluctuation of the output voltage VOUT based on the output of the comparator 522, and at the same time, may control on/off switching timing of transistors included in the DC-DC converter 510 similarly to that described with reference to FIGS. 10 to 16. In an example, the timing controller 524 may control on/off switching timing of each of the transistors included in the DC-DC converter 510, such that the input node receiving the input voltage VIN from the DC-DC converter 510 is not directly connected to the ground node.

The driver 530 may output control signals for controlling transistors included in the DC-DC converter 510. For example, the driver 530 may include a level shifter 531, a gate driver 532, and the like. The gate driver 532 may output first to third control signals VS1-VS3 fluctuating at different voltage levels.

The control logic 520 and the driver 530 may operate by receiving a voltage generated during the operation of the DC-DC converter 510 as a power supply voltage. For example, the control logic 520 may use a voltage of VIN/3 level generated during the operation of the DC-DC converter 510 as a power supply voltage. Accordingly, a maximum level of the PWM signal output by the timing controller 524 also cannot exceed the VIN/3 level.

However, as in the example embodiments described above with reference to FIGS. 1 to 16, a voltage of a level greater than the VIN/3 level may be applied to at least a portion of the plurality of transistors included in the DC-DC converter 510. For example, in the example embodiment illustrated in FIG. 2, the first transistor TR1 may receive the input voltage VIN as it is, and therefore, in a case in which the voltage of VIN/3 level is input to the first transistor TR1, the first transistor TR1 may not be switched on/off normally.

To prevent this problem, in an example embodiment of the present disclosure, the level of the PWM signal output by the timing controller 524 may be increased using the level shifter 531, and control voltage signals VS1-VS3 suitable for switching on/off switching transistors may be generated. Accordingly, the gate driver 532 may operate using the power supply voltage VIN level, the 2*VIN/3 level, the VIN/3 level, and the ground voltage level.

When the DC-DC converter 510 is implemented according to one of the example embodiments described above with reference to FIGS. 1 to 16, the output voltage VOUT may have a magnitude of VIN/3 or less. In an example embodiment, the first control voltage signal VS1 may be a signal fluctuating between the level of the ground voltage and the level of VIN/3, the second control voltage signal VS2 may be a signal fluctuating between a VIN/3 level and a 2*VIN/3 level. The third control voltage signal VS3 may be a signal fluctuating between a level of 2*VIN/3 and a level of the input voltage VIN.

The first to third control voltage signals VS1-VS3 may be selectively input to the transistors according to the level of voltage across the transistors included in the DC-DC converter 510. By way of example with reference to the circuit diagram illustrated in FIG. 2, a third control voltage signal VS3 fluctuating at a highest level may be input to the seventh transistor TR7, and a second control voltage signal VS2 fluctuating at an intermediate level may be input to the third transistor TR3. Alternatively or additionally, the first control voltage signal VS1 fluctuating at a lowest level may be input to the fourth transistor TR4.

Figure 19A:
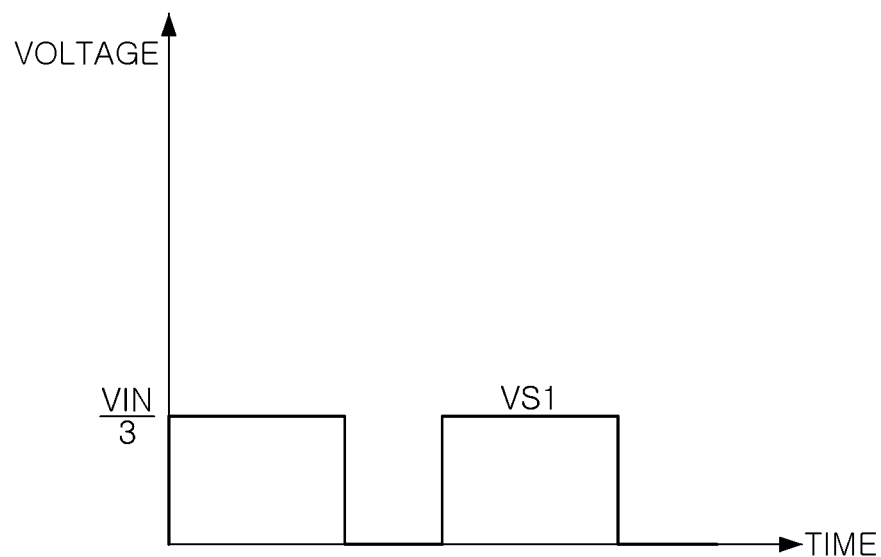
FIGS. 19A to 19C are graphs illustrating the operation of a power supply device according to various example embodiments.
Figure 19B:
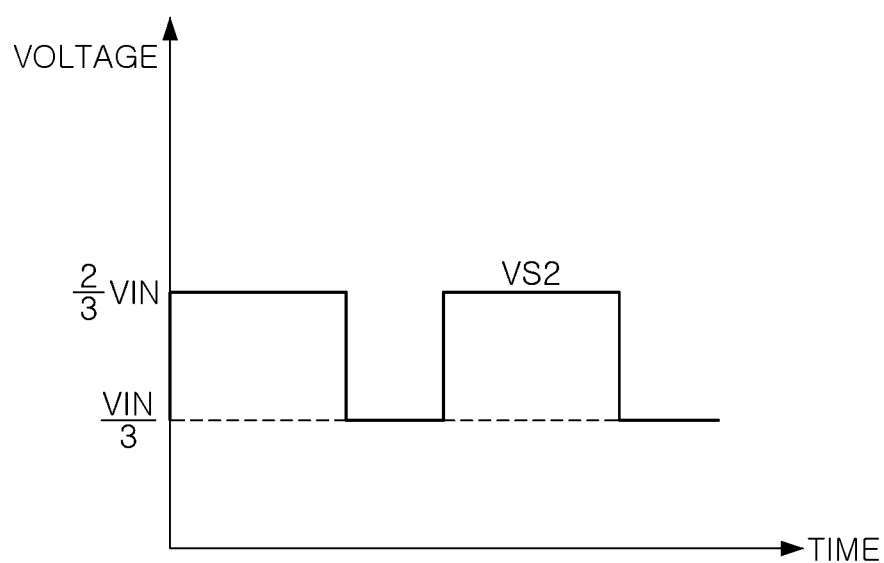
Figure 19C:
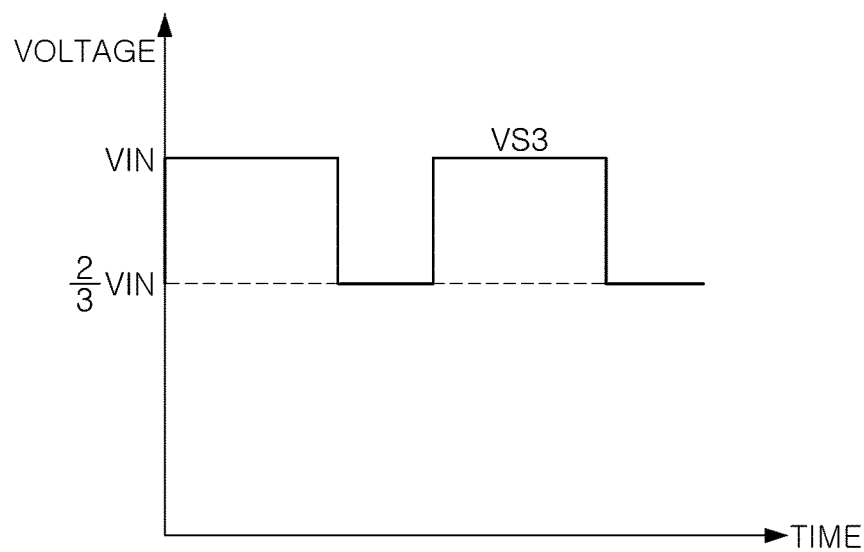

FIGS. 19A to 19C are graphs illustrating the operation of a power supply device according to an example embodiment.

FIG. 19A is a graph illustrating a first control voltage signal VS1. The first control voltage signal VS1 may be a PWM signal fluctuating between a ground voltage level and a VIN/3 level. Referring to the circuit diagram of the DC-DC converter 100 according to the example embodiment illustrated in FIG. 2, the first control voltage signal VS1 may be applied to the fourth transistor TR4 and the fifth transistor TR5, as a control signal. A complementary signal of the first control voltage signal VS1 may be input as a control signal to each of the second transistor TR2 and the eighth transistor TR8.

FIG. 19B is a graph illustrating a second control voltage signal VS2, and the second control voltage signal VS2 may be a PWM signal fluctuating between a VIN/3 level and a 2*VIN/3 level. Similarly, referring to the circuit diagram of the DC-DC converter 100 illustrated in FIG. 2, the second control voltage signal VS2 may be input to the third transistor TR3 and the sixth transistor TR6, as a control signal.

FIG. 19C is a graph illustrating the third control voltage signal VS3, and the third control voltage signal VS3 may be a PWM signal fluctuating between the 2*VIN/3 level and the level of the input voltage VIN. Referring also to the circuit diagram of the DC-DC converter 100 illustrated in FIG. 2, the third control voltage signal VS3 may be input to the first transistor TR1 and the seventh transistor TR7 as a control signal.

Figure 20:
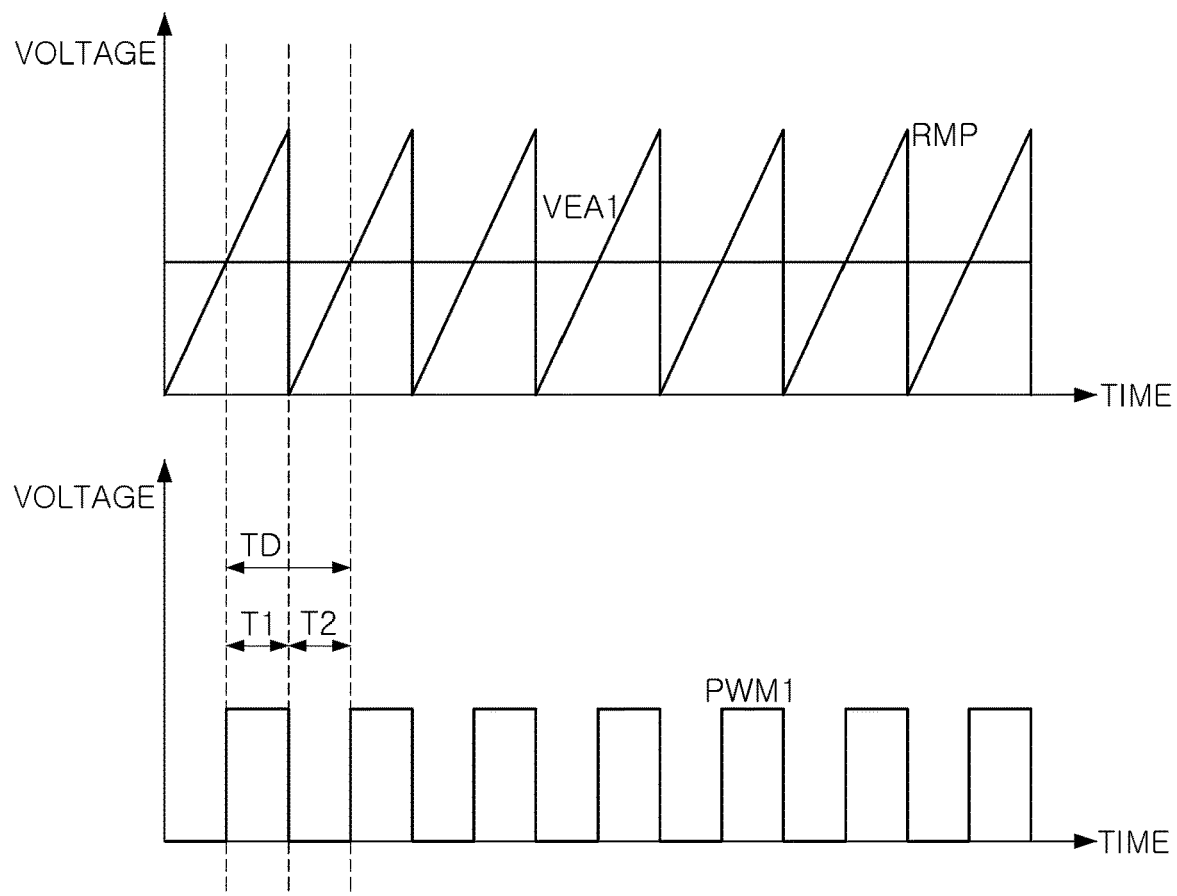
FIGS. 20 to 22 are graphs illustrating the operation of a power supply device according to various example embodiments.
Figure 21:
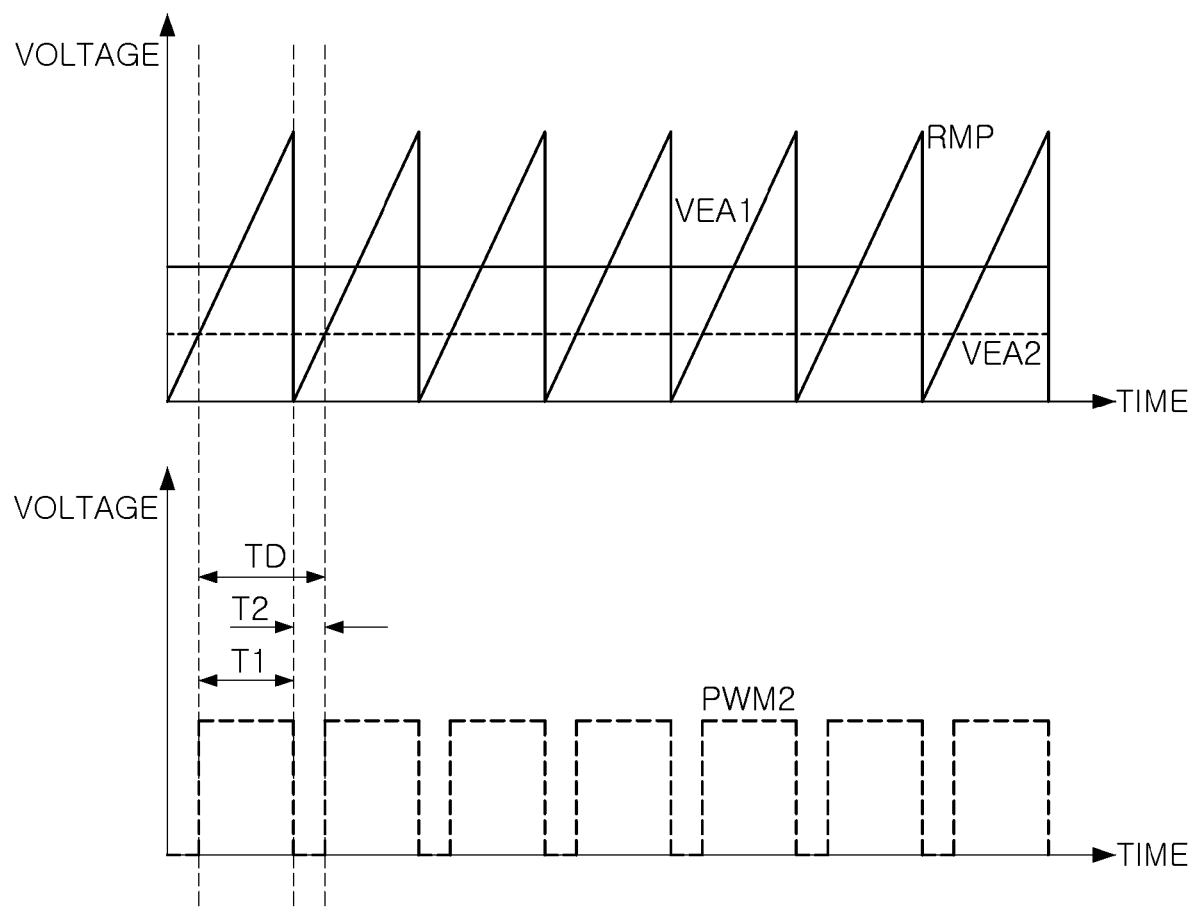
Figure 22:
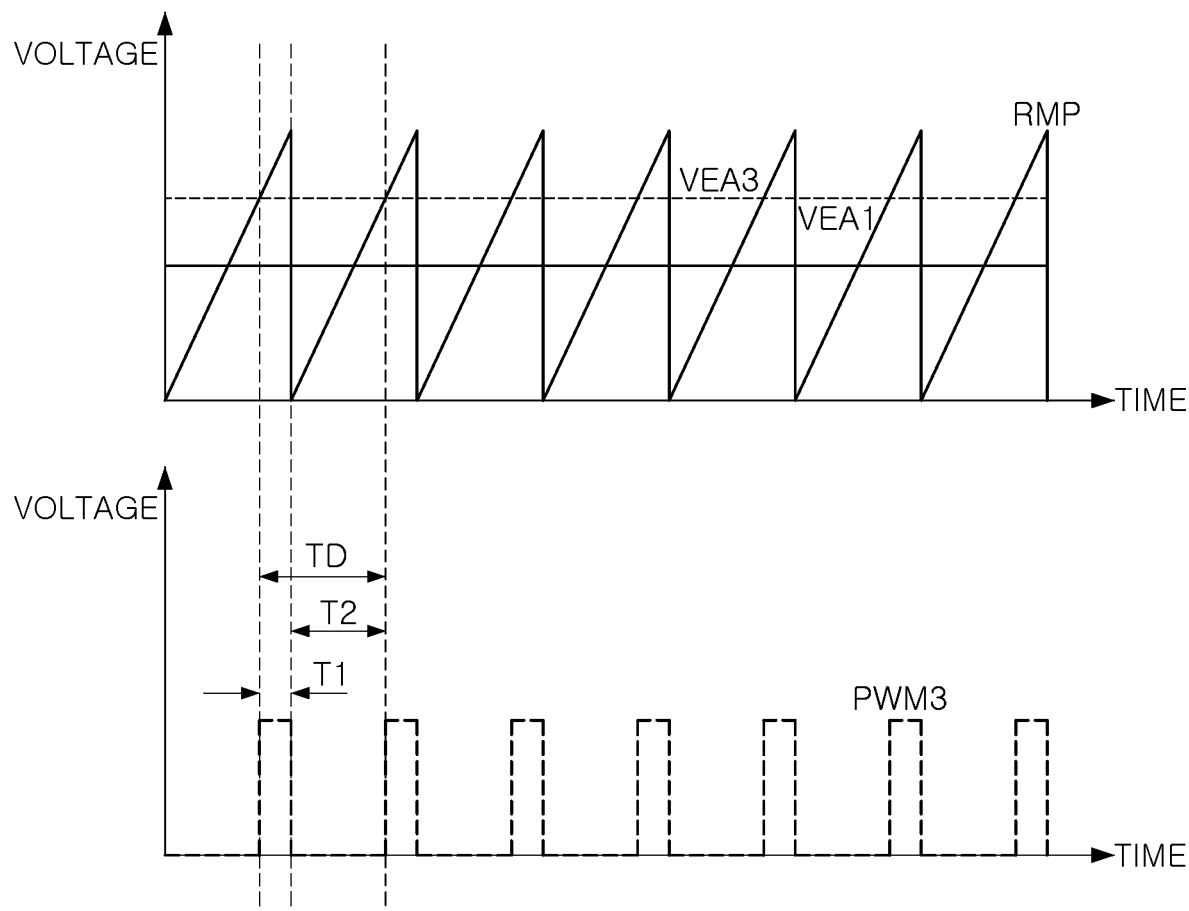

FIGS. 20 to 22 are graphs illustrating the operation of the power supply device according to an example embodiment.

Hereinafter, the operation of the power supply device 500 illustrated in FIG. 18 is described with reference to the drawings. FIG. 20 is a graph illustrating an example embodiment in which the output voltage VOUT of the DC-DC converter 510 maintains a stable state at a level similar to a target voltage. Referring to FIG. 20, when the output voltage VOUT maintains a stable state at a level similar to the target voltage, the error amplifier 521 included in the control logic 520 may output a first error voltage VEA1.

The comparator 522 may output a first PWM signal PWM1 by comparing the first error voltage VEA1 with the ramp voltage RMP. When the ramp voltage RMP is input to the non-inverting terminal of the comparator 522 and the first error voltage VEA1 is input to the inverting terminal, the first PWM signal PWM1 may have a high level during a time when the first error voltage VEA1 is less than the ramp voltage RMP. The period TD of the first PWM signal PWM1 may be the same as the period of the ramp voltage RMP, the first time period T1 corresponds to a time when the first error voltage VEA1 is less than the ramp voltage RMP, and the second time period T2 may correspond to a time when the first error voltage VEA1 is greater than the ramp voltage RMP.

FIG. 21 is a graph illustrating an example embodiment in which the output voltage VOUT of the DC-DC converter 510 decreases to a level lower than the target voltage. Referring to FIG. 21, as the output voltage VOUT decreases to a level lower than the target voltage, the error amplifier 521 may output a second error voltage VEA2 smaller than the first error voltage VEA1.

The comparator 522 may output a second PWM signal PWM2 by comparing the second error voltage VEA2 with the ramp voltage RMP. Similarly to FIG. 20, the ramp voltage RMP may be input to the non-inverting terminal of the comparator 522 and the first error voltage VEA1 may be input to the inverting terminal of the comparator 522. Accordingly, the second PWM signal PWM2 has a high level during the first time period T1 in which the second error voltage VEA2 is smaller than the ramp voltage RMP, and during a second time period T2 in which the second error voltage VEA2 is greater than the ramp voltage RMP, the second PWM signal PWM2 may have a low level.

Compared with FIG. 20, in the example embodiment illustrated in FIG. 21, since the second error voltage VEA2 has a lower level than the first error voltage VEA1, the first time period T1 may increase and the second time period T2 may decrease within one period TD of the second PWM signal PWM2. As a result, as the first time period T1, which is the time for charging energy in the inductor connected to the output terminal of the switched capacitor circuit in the DC-DC converter 510, is relatively increased, the output voltage VOUT may increase again.

FIG. 22 is a graph illustrating an example embodiment in which the output voltage VOUT of the DC-DC converter 510 increases to a level greater than the target voltage. Referring to FIG. 22, as the output voltage VOUT increases greater than the target voltage, the error amplifier 521 may output a third error voltage VEA3 greater than the first error voltage VEA.

The comparator 522 may output a third PWM signal PWM3 by comparing the third error voltage VEA3 input to the inverting terminal with the ramp voltage RMP input to the non-inverting terminal. The third PWM signal PWM3 may have a high level during the first time period T1 when the third error voltage VEA3 is less than the ramp voltage RMP, and the third PWM signal PWM3 may have a low level during a second time period T2 in which the third error voltage VEA3 is greater than the ramp voltage RMP.

Compared with the graph of FIG. 20, in the example embodiment illustrated in FIG. 22, since the third error voltage VEA3 has a higher level than the first error voltage VEA1, the first time period T1 may decrease and the second time period T2 may increase within one period TD of the third PWM signal PWM3. As a result, as the first time period T1, which is the time for charging energy in the inductor connected to the output terminal of the switched capacitor circuit in the DC-DC converter 510, is relatively short, the output voltage VOUT may decrease.

As described with reference to FIGS. 20 to 22, the control logic 520 and the driver 530 may stably drive the DC-DC converter 510 by adaptively adjusting the duty ratio of the PWM signal according to the increase/decrease of the output voltage VOUT of the DC-DC converter 510.

As set forth above, according to example embodiments, a DC-DC converter may include a plurality of transistors and a plurality of capacitors operating as switches, and an LC filter. The DC-DC converter may supply current by distributing a plurality of current paths to an inductor included in an LC filter, thereby reducing a change in an operating efficiency of the DC-DC converter according to a ratio of an input voltage to an output voltage. Alternatively or additionally, conduction loss may be reduced by reducing the number of transistors included in each of the plurality of current paths, and the DC-DC converter may be implemented by low voltage transistors by reducing a voltage applied to each of the transistors. In addition, without a separate feedback circuit, a voltage change of the capacitors may be significantly reduced.

While example embodiments have been illustrated and described above, it will be apparent to those skilled in the art that modifications and variations could be made without departing from the scope of the present disclosure as defined by the appended claims.

What is claimed is:
1. A direct current-to-direct current (DC-DC) converter, comprising:

a first switching circuit comprising a first transistor coupled between a first capacitor and an input node, a second transistor coupled between the first capacitor and a second capacitor, a third transistor coupled between a first node and a third capacitor, and a fourth transistor coupled between the third capacitor and a ground node, the first node being between the second capacitor and the second transistor;

a second switching circuit comprising a fifth transistor coupled between the second capacitor and the third capacitor, a sixth transistor and a seventh transistor coupled between the first capacitor and the third capacitor, and an eighth transistor coupled between the first capacitor and the ground node;

a fourth capacitor coupled to a second node between the sixth transistor and the seventh transistor; and an inductor-capacitor (LC) filter coupled to a third node, the third node coupling the first capacitor, the second transistor, and the eighth transistor.

2. The DC-DC converter of claim 1, wherein
the first transistor is a first p-type metal oxide semiconductor (PMOS) transistor,
the second transistor is a second PMOS transistor,
the third transistor is a first n-type metal oxide semiconductor (NMOS) transistor,
the fourth transistor is a second NMOS transistor,
the fifth transistor is a third PMOS transistor,
the sixth transistor is a fourth PMOS transistor,
the seventh transistor is a third NMOS transistor, and
the eighth transistor is a fourth NMOS transistor.

3. The DC-DC converter of claim 1, wherein a fourth capacity of the fourth capacitor is lower than a first capacity of the first capacitor, a second capacity of the second capacitor, and a third capacity of the third capacitor.

4. The DC-DC converter of claim 1, further comprising an integrated circuit chip that comprises the first transistor, the second transistor, the third transistor, the fourth transistor, the fifth transistor, the sixth transistor, the seventh transistor, the eighth transistor, and the fourth capacitor,
the first capacitor, the second capacitor, the third capacitor, and the LC filter being external elements of the integrated circuit chip.

5. The DC-DC converter of claim 1, wherein the LC filter comprises an inductor coupled to the third node, and an output capacitor coupled to the inductor.

6. The DC-DC converter of claim 5, wherein a first capacity of the output capacitor is greater than a second capacity of the fourth capacitor.

7. The DC-DC converter of claim 1, wherein the third transistor is coupled between the first node and the second node, and
the second node is between the third capacitor and the sixth transistor.

8. The DC-DC converter of claim 7, wherein the seventh transistor is coupled between a fourth node and the second node, and
the fourth node is between the first capacitor and the first transistor.

9. The DC-DC converter of claim 8, wherein the sixth transistor is coupled between a fifth node and the second node, and
the fifth node couples the third capacitor and the third transistor.

10. The DC-DC converter of claim 1, wherein a first voltage across the first capacitor is greater than a second voltage across the second capacitor, and
the first voltage across the first capacitor is greater than a third voltage across the third capacitor.

* * * * *